(12) United States Patent
Tanaka et al.

(10) Patent No.: US 8,140,941 B2
(45) Date of Patent: Mar. 20, 2012

(54) DATA RECEIVING APPARATUS, DATA RECEIVING METHOD, AND COMPUTER-READABLE RECORDING MEDIUM

(75) Inventors: Shingo Tanaka, Yokohama (JP); Shunichi Gondo, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 670 days.

(21) Appl. No.: 12/365,741

(22) Filed: Feb. 4, 2009

(65) Prior Publication Data

US 2010/0050055 A1 Feb. 25, 2010

(30) Foreign Application Priority Data

Aug. 22, 2008 (JP) ................................. 2008-214034

(51) Int. Cl.
*G06F 11/00* (2006.01)
(52) U.S. Cl. ........................ 714/764; 714/776
(58) Field of Classification Search .................. 714/751, 714/764, 776
See application file for complete search history.

(56) References Cited

U.S. PATENT DOCUMENTS

| | | | | |
|---|---|---|---|---|
| 6,675,340 B1* | 1/2004 | Hardie et al. | ................. | 714/751 |
| 6,851,084 B2* | 2/2005 | Pattavina | ..................... | 714/776 |
| 6,978,343 B1* | 12/2005 | Ichiriu | .......................... | 711/108 |
| 7,020,823 B2* | 3/2006 | Bushmitch et al. | ........... | 714/752 |
| 7,055,090 B2* | 5/2006 | Kikuchi et al. | ................ | 714/801 |
| 7,228,422 B2* | 6/2007 | Morioka et al. | .............. | 713/171 |
| 7,716,559 B2* | 5/2010 | Champel | ......................... | 714/776 |
| 2005/0160346 A1* | 7/2005 | Yamane | ......................... | 714/776 |
| 2007/0300127 A1* | 12/2007 | Watson et al. | ................ | 714/758 |
| 2008/0222494 A1 | 9/2008 | Gondo et al. | | |
| 2009/0063928 A1* | 3/2009 | Gondo et al. | ................. | 714/752 |
| 2009/0276686 A1* | 11/2009 | Liu et al. | ....................... | 714/776 |

FOREIGN PATENT DOCUMENTS

JP 2008-131153 6/2008

* cited by examiner

*Primary Examiner* — Robert Beausoliel, Jr.
*Assistant Examiner* — Elmira Mehrmanesh
(74) *Attorney, Agent, or Firm* — Finnegan, Henderson, Farabow, Garrett & Dunner, L.L.P.

(57) ABSTRACT

A data receiving method according to the present invention includes: storing received packets in a data storing unit; storing, in a data-storage-information storing unit, information indicating data portions are stored; specifying FEC parameters of column FEC packets and row FEC packets; specifying a leading FEC packet using at least SNBase of a first column FEC packet and SNBase of a second column FEC packet or a row FEC packet; specifying an FEC packet group corresponding to a matrix same as a matrix of the leading FEC packet; selecting one FEC packet from the FEC packet group; judging whether restoration processing can be performed by using the selected FEC packet; storing, when a lost data packet is restored, the restored data packet in the data storing unit; and storing, in the data-storage-information storing unit, information indicating that the restored data packet is present.

21 Claims, 16 Drawing Sheets

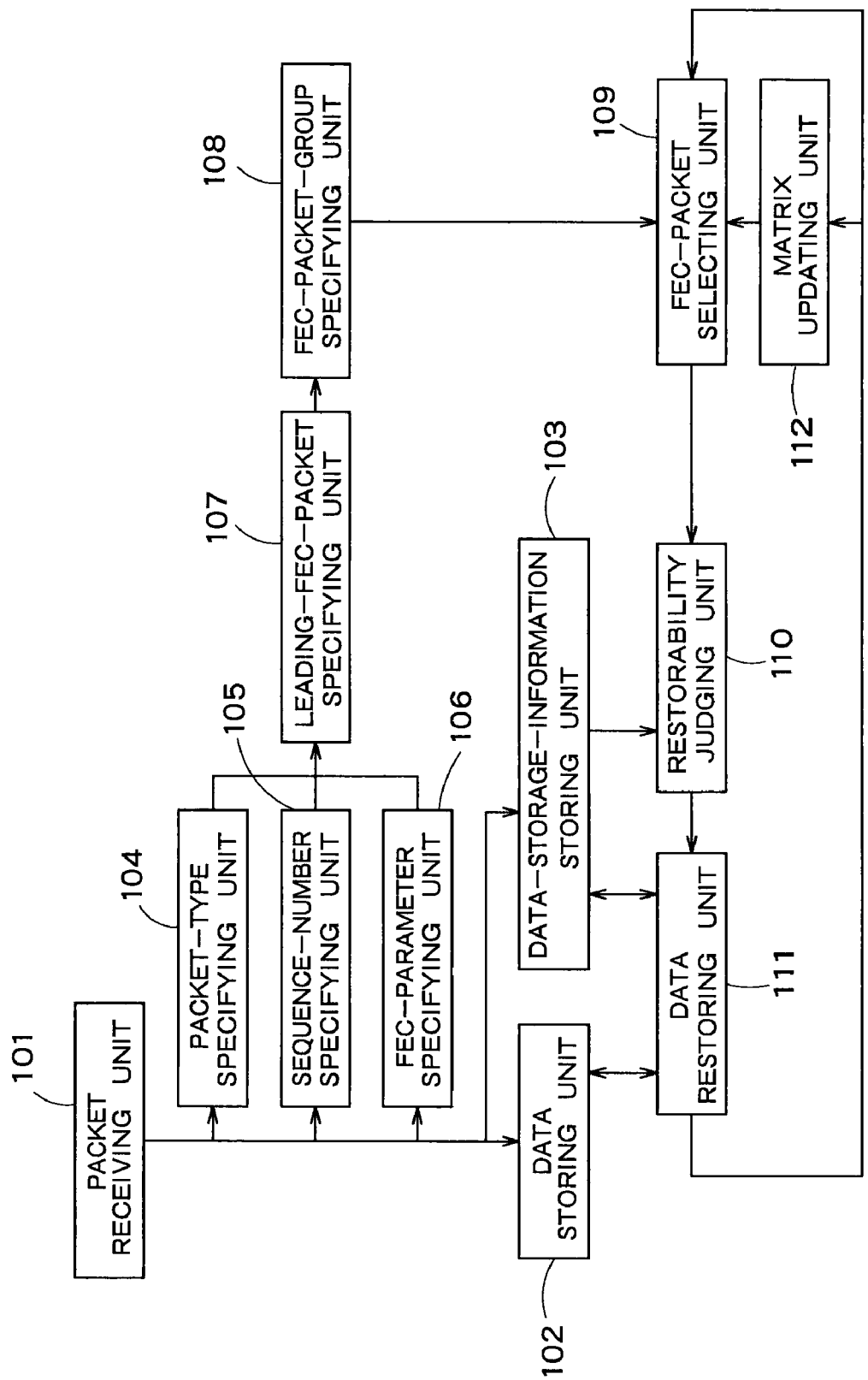
F I G. 1

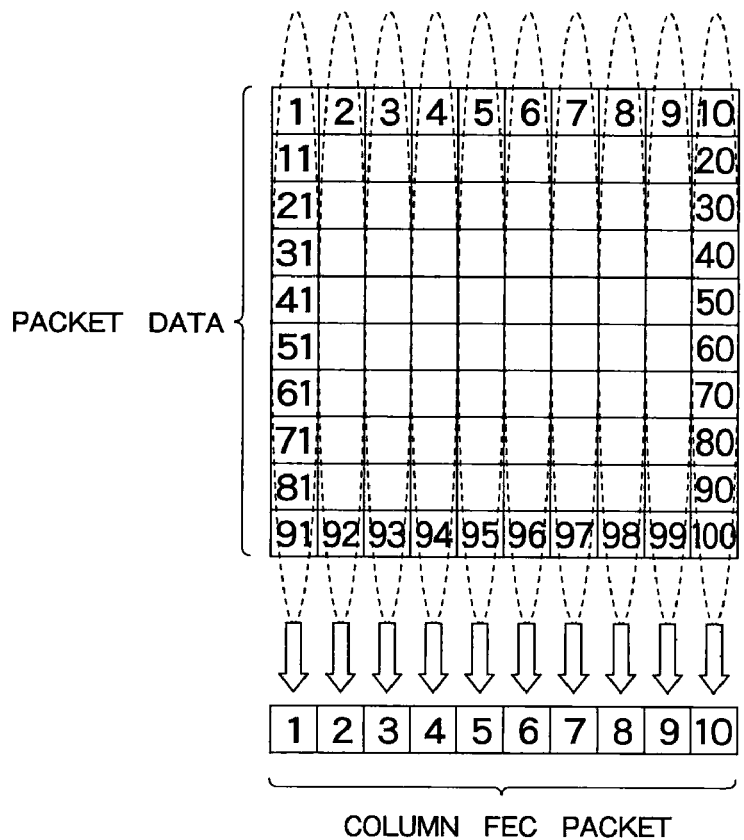
F I G. 2A
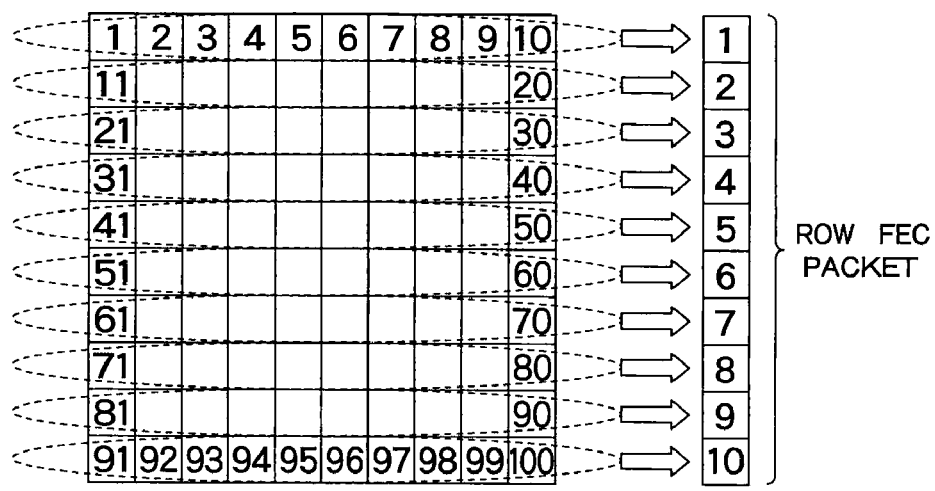
F I G. 2B

LOST DATA PACKET

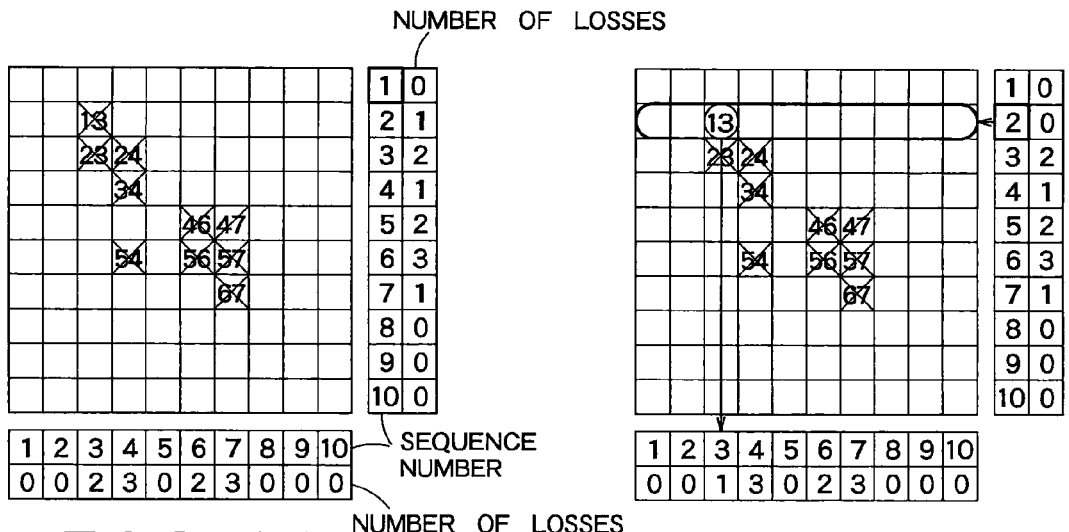
FIG. 14A  FIG. 14B
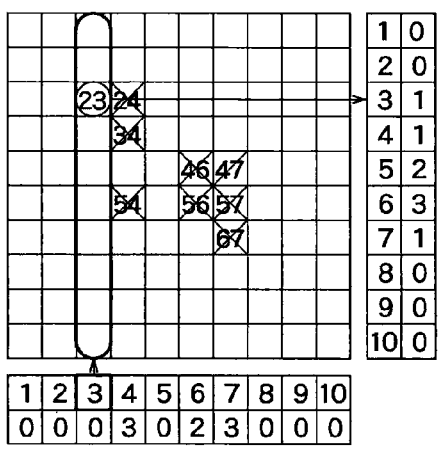 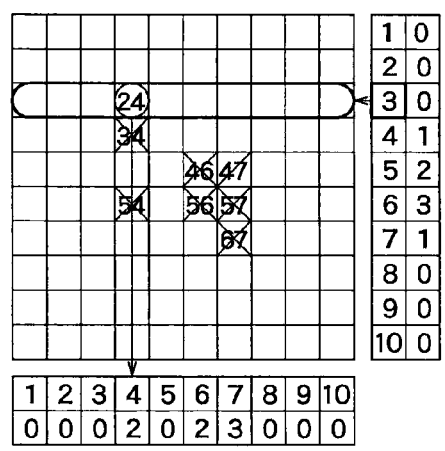
FIG. 14C  FIG. 14D
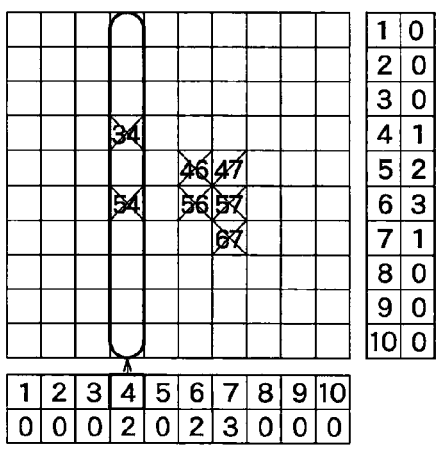 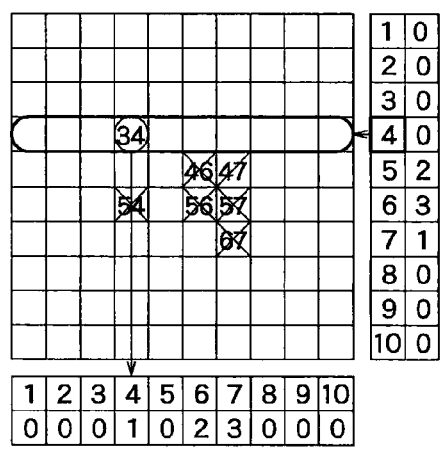
FIG. 14E  FIG. 14F

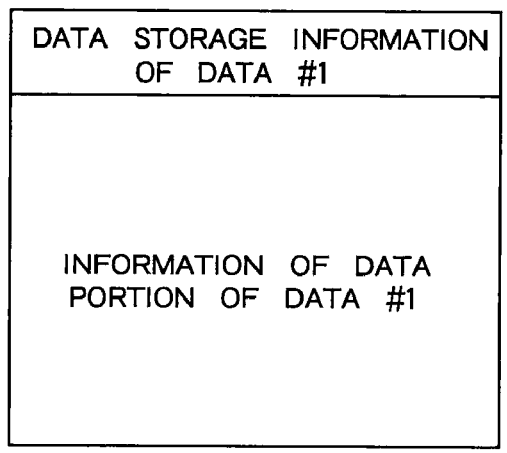
| DATA STORAGE INFORMATION OF DATA #1 |
|---|
| INFORMATION OF DATA PORTION OF DATA #1 |
F I G. 15
F I G. 16

DATA RECEIVING APPARATUS, DATA RECEIVING METHOD, AND COMPUTER-READABLE RECORDING MEDIUM

CROSS REFERENCE TO RELATED APPLICATION

This application is based upon and claims the benefit of priority from the Japanese Patent Application No. 2008-214034, filed on Aug. 22, 2008, the entire contents of which are incorporated herein by reference.

BACKGROUND OF THE INVENTION

1. Field of the Invention

The present invention relates to a data receiving apparatus, a data receiving method, and a computer-readable recording medium.

2. Related Art

In recent years, an IPTV that transmits TV signals on an IP network is widely used. A transmission protocol for the IPTV is set in a specification called "Pro-MPEG" (Moving Picture Experts Group). In the Pro-MPEG, it is assumed that a large number of reception nodes for videos delivered by servers are present and, in order to suppress loads on transmission servers, multicast transmission is used.

In the case of the multicast transmission, since guarantee of reachability of data by a TCP (Transmission Control Protocol) cannot be used, a method of recovering a loss of data to a certain degree with FEC (Forward Error Correction) is used.

The FEC is a method of restoring, when a part of data is lost as a result of adding redundant data to data desired to be transmitted and transmitting the data, the lost data using the remaining data not lost and the redundant data of the data (see, for example, JP-A 2008-131153 (Kokai)).

For example, specifically, when data A, B, and C are transmitted, data X calculated according to X=A xor B xor C is also transmitted. As a result of the transmission, when the data B is lost, a reception side can restore the data B from the remaining data A, C, and X according to B=A xor C xor X. However, two or more data such as A and B are lost, the data cannot be restored.

In the case of the IPTV, it is specified by the Pro-MPEG specification that a loss of data (video data and sound data) is compensated by applying the FEC. An FEC packet to be transmitted is generated by arranging plural data packets transmitted as RTP (Real time Transport Protocol) packets in a matrix shape, grouping the data packets in the vertical direction and the horizontal direction, and performing an exclusive OR (xor) operation of the grouped data packets. An FEC packet calculated from the group in the vertical direction is called column FEC packet and an FEC packet calculated from the group in the horizontal direction is called row FEC packet.

Three parameters (FEC parameters) called "SNBase", "Offset", and "NA" are included in headers of the FEC packets to be transmitted. SNBase indicates a sequence number of a leading data packet among the grouped data packets corresponding to the FEC packets. Offset indicates a sequence number of the data packets adjacent to each other in the same group. NA indicates the number of packets included in the groups.

A data reception side specifies a column FEC packet and a row FEC packet corresponding to the same matrix using the three parameters and performs data restoration processing. However, a method of specifying FEC packets corresponding to the same matrix from received plural FEC packets and specifying, for example, where in matrixes each of the FEC packets is located (a position of the FEC packet counted from the top) is not disclosed. Therefore, it is impossible to efficiently specify FEC packets corresponding to the same matrix and where in matrixes each of the FEC packets is located.

In data restoration processing, it is possible to cope with a larger number of losses by repeatedly performing restoration using column FEC packets and restoration using row FEC packets. However, since a load of repeated processing is high, it is requested to efficiently perform restoration of data without restoration omissions.

SUMMARY OF THE INVENTION

According to one aspect of the present invention, there is provided a data receiving apparatus comprising:

a packet receiving unit that receives packets;

a packet-type specifying unit that specifies which of types of a data packet, a column FEC packet, and a row FEC packet the packets are;

a sequence-number specifying unit that specifies sequence numbers of the packets;

a data storing unit that stores, in association with the specified types and the specified sequence numbers;

a data-storage-information storing unit that stores, in association with sequence numbers of data packets received by the packet receiving unit, data storage information indicating that data portions of the data packets are stored in the data storing unit;

an FEC-parameter specifying unit that analyzes headers of column FEC packets and row FEC packets and specifies FEC parameters including SNBase (a value indicating a minimum sequence number among sequence numbers of plural data packets used for generation of an FEC packet), Offset (a value indicating difference between sequence numbers of data packets adjacent to each other when the plural data packets used for generation of the FEC packet are arranged in order of the sequence numbers), and NA (a value indicating a number of the data packets used for generation of the FEC packet);

a leading-FEC-packet specifying unit that specifies, using at least SNBase specified from a first column FEC packet and SNBase specified from a second column FEC packet or a row FEC packet, a leading column FEC packet and a leading row FEC packet as FEC packets at a top of a matrix;

an FEC-packet-group specifying unit that specifies a column FEC packet group including column FEC packets corresponding to a matrix same as the matrix of the leading column FEC packet and a row FEC packet group including row FEC packets corresponding to a matrix same as the matrix of the leading row FEC packet;

an FEC-packet selecting unit that selects one FEC packet from the column FEC packet group or the row FEC packet group;

a restorability judging unit that specifies, on the basis of the FEC parameter of the FEC packet selected by the FEC-packet selecting unit, sequence numbers of plural data packets corresponding to the selected FEC parameter, detects, on the basis of the data storage information stored in the data-storage-information storing unit, whether data portions of the data packets with the specified plural sequence numbers are stored in the data storing unit, judges, when a number of lost data packets, data portions of which are not stored, is one, that restoration of the lost data packet is possible and outputs a restoration start signal, and, judges, when the number of lost data packets is other than one, that restoration of the lost data packets is impossible; and a data-restoring unit that reads out, on the basis of the restoration start signal, data of a FEC packet and a data packet corresponding to the lost data packet from the data storing unit, restores the lost data packet using the read-out data, stores the restored data packet in the data storing unit, and stores, in the data-storage-information storing unit in association with a sequence number of the restored data packet, data storage information indicating that a data portion of the restored data packet is stored in the data storing unit.

According to one aspect of the present invention, there is provided a data receiving method comprising:

receiving packets;

specifying which of types of a data packet, a column FEC packet, and a row FEC packet the packets are;

specifying sequence numbers of the packets;

storing, in association with the specified types and the specified sequence numbers, the packets in a data storing unit;

storing, in a data-storage-information storing unit in association with sequence number of received data packets, data storage information indicating that data portions of the data packets are stored in the data storing unit;

analyzing headers of column FEC packets and row FEC packets of the received packets and specifying FEC parameters including SNBase (a value indicating a minimum sequence number among sequence numbers of plural data packets used for generation of an FEC packet), Offset (a value indicating difference between sequence numbers of data packets adjacent to each other when the plural data packets used for generation of the FEC packet are arranged in order of the sequence numbers), and NA (a value indicating a number of the data packets used for generation of the FEC packet);

specifying, using at least SNBase specified from a first column FEC packet and SNBase specified from a second column FEC packet or a row FEC packet, a leading column FEC packet and a leading row FEC packet as FEC packets at a top of a matrix;

specifying a column FEC packet group including column FEC packets corresponding to a matrix same as the matrix of the leading column FEC packet and a row FEC packet group including row FEC packets corresponding to a matrix same as the matrix of the leading row FEC packet;

selecting one FEC packet from the column FEC packet group or the row FEC packet group;

specifying, on the basis of the FEC parameter of the selected FEC packet, sequence numbers of plural data packets corresponding to the selected FEC parameter, detecting, on the basis of the data storage information stored in the data-storage-information storing unit, whether data portions of the data packets with the specified plural sequence numbers are stored in the data storing unit, judging, when a number of lost data packets, data portions of which are not stored, is one, that restoration of the lost data packet is possible and judging, when the number of lost data packets is other than one, that restoration of the lost data packets is impossible; and reading out, when it is judged that the lost data packet is restorable, data of a FEC packet and a data packet corresponding to the lost data packet from the data storing unit, restoring the lost data packet using the read-out data, storing the restored data packet in the data storing unit, and storing, in the data-storage-information storing unit in association with a sequence number of the restored data packet, data storage information indicating that a data portion of the restored data packet is stored in the data storing unit.

According to one aspect of the present invention, there is provided a computer-readable recording medium having recorded therein a data receiving program which causes a computer to execute:

a step of receiving packets;

a step of specifying which of types of a data packet, a column FEC packet, and a row FEC packet the packets are;

a step of specifying sequence numbers of the packets;

a step of storing, in association with the specified types and the specified sequence numbers, the packets in a data storing unit;

a step of storing, in a data-storage-information storing unit in association with sequence number of received data packets, data storage information indicating that data portions of the data packets are stored in the data storing unit;

a step of analyzing headers of a column FEC packet and a row FEC packet of the received packets and specifying FEC parameters including SNBase (a value indicating a minimum sequence number among sequence numbers of plural data packets used for generation of an FEC packet), Offset (a value indicating difference between sequence numbers of data packets adjacent to each other when the plural data packets used for generation of the FEC packet are arranged in order of the sequence numbers), and NA (a value indicating a number of the data packets used for generation of the FEC packet);

a step of specifying, using at least SNBase specified from a first column FEC packet and SNBase specified from a second column FEC packet or a row FEC packet, a leading column FEC packet and a leading row FEC packet as FEC packets at a top of a matrix;

a step of specifying a column FEC packet group including column FEC packets corresponding to a matrix same as the matrix of the leading column FEC packet and a row FEC packet group including row FEC packets corresponding to a matrix same as the matrix of the leading row FEC packet;

a step of selecting one FEC packet from the column FEC packet group or the row FEC packet group;

a step of specifying, on the basis of the FEC parameter of the selected FEC packet, sequence numbers of plural data packets corresponding to the selected FEC parameter, detecting, on the basis of the data storage information stored in the data-storage-information storing unit, whether data portions of the data packets with the specified plural sequence numbers are stored in the data storing unit, judging, when a number of lost data packets, data portions of which are not stored, is one, that restoration of the lost data packet is possible and judging, when the number of lost data packets is other than one, that restoration of the lost data packets is impossible; and a step of reading out, when it is judged that the lost data packet is restorable, data of a FEC packet and a data packet corresponding to the lost data packet from the data storing unit, restoring the lost data packet using the read-out data, storing the restored data packet in the data storing unit, and storing, in the data-storage-information storing unit in association with a sequence number of the restored data packet, data storage information indicating that a data portion of the restored data packet is stored in the data storing unit.

BRIEF DESCRIPTION OF THE DRAWINGS

FIG. 1 is a schematic diagram of a data receiving apparatus according to an embodiment of the present invention;

FIGS. 2A and 2B are diagrams of an example of FEC packet generation;

FIGS. 7A to 7D are diagrams of an example of processing for restoring lost data packets;

FIGS. 14A to 14F are diagrams of still another example of the processing for restoring lost data packets;

FIG. 15 is a diagram of an example of a storage area for data storage information;

FIG. 16 is a diagram of an example of transmission timing for FEC packets.

DESCRIPTION OF THE EMBODIMENTS

Figure 3:
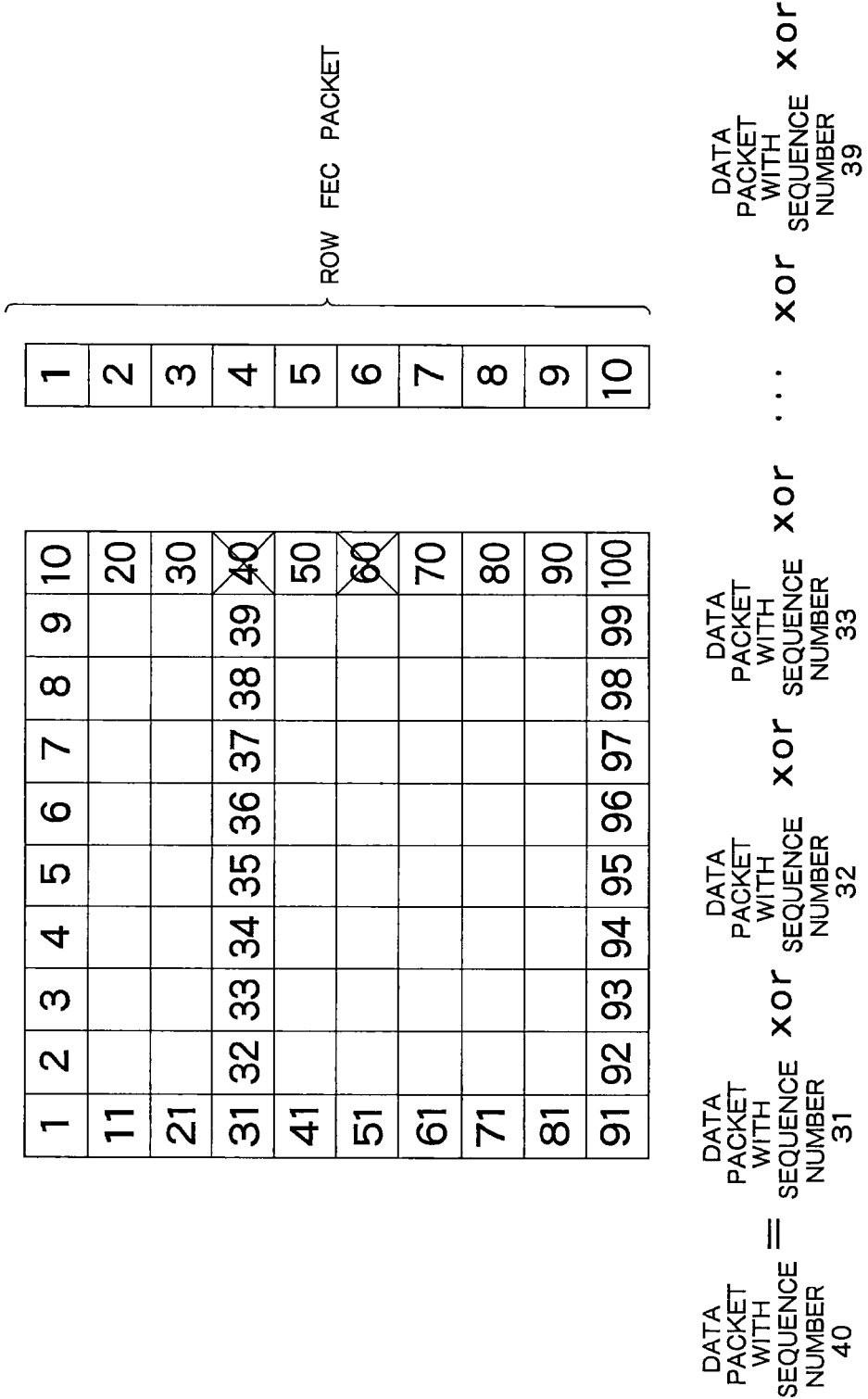
FIG. 3 is a diagram of an example of restoration of lost data packets.

Embodiments of the present invention are explained below with reference to the accompanying drawings.

A schematic configuration of a data receiving apparatus according to an embodiment of the present invention is shown in FIG. 1. The data receiving apparatus is an apparatus that receives, through a network such as an Ethernet or a wireless LAN, data such as video and sound converted into packets. The data receiving apparatus receives, together with the data packets, two-dimensional FEC packets for performing forward error correction and performs restoration (error correction) processing for lost data. The two-dimensional FEC packets include row FEC packets and column FEC packets. The data packets and the FEC packets are transmitted by, for example, RTP/UDP/IP packets.

The data receiving apparatus includes a packet receiving unit 101, a data storing unit 102, a data-storage-information storing unit 103, a packet-type specifying unit 104, a sequence-number specifying unit 105, an FEC-parameter specifying unit 106, a leading-FEC-packet specifying unit 107, an FEC-packet-group specifying unit 108, an FEC-packet selecting unit 109, a restorability judging unit 110, a data restoring unit 111, and a matrix updating unit 112.

The packet receiving unit 101 receives the data packets and the FEC packets via a network. The packet-type specifying unit 104 specifies, referring to a UDP port number, whether the received packets are data packets or FEC packets. When the received packets are the FEC packets, the packet-type specifying unit 104 analyzes FEC headers and specifies whether the FEC packets are row FEC packets or column FEC packets.

The sequence-number specifying unit 105 analyzes RTP headers and specifies sequence numbers of the received packets. The received packets are stored in the data storing unit 102 on the basis of the specified packet types and the specified sequence numbers in association with information concerning the packet type and the sequence numbers. The data storing unit 102 includes a memory or the like.

As a method of associating the received packets and the information concerning the specified packet type and the specified sequence numbers, for example, pointers indicating addresses in which the packets are written, port number information, and sequence number information are stored in the same structure.

When the packet-type specifying unit and the sequence-number specifying unit specify a packet type and sequence numbers before the packets are written in the data storing unit 102, the received packets may be written in addresses obtained by adding offsets corresponding to the sequence numbers to the addresses in a memory area corresponding to the packet type.

In both the methods, it is possible to specify, from the information concerning the packet type and the sequence numbers, addresses in which the received packets are written and access the received packets. The same holds true for all of the data packets, the row FEC packets, and the column FEC packets.

The data-storage-information storing unit 103 stores, in association with sequence numbers of data packets, data storage information indicating that data portions of the data packets are stored in the data storing unit 102. As a method of associating the data storage information with information concerning the sequence numbers, for example, pointers indicating addresses in which the data storage information is written and the sequence number information are stored in the same structure.

The data storage information may be written in addresses obtained by adding offsets corresponding to the sequence numbers to the addresses. In both the methods, it is possible to specify, from the sequence numbers, the addresses in which the data storage information is written and access the addresses.

It is possible to learn, by referring to the data storage information, whether the data portions of the data packets are stored in the data storing unit 102 or whether the data portions are not stored in the data storing unit 102 and are lost according to the transmission through the network. The data-storage-information storing unit 103 includes an on-chip memory or the like.

The FEC-parameter specifying unit 106 specifies FEC parameters from received FEC packets. To explain the FEC parameters, first, the column FEC packet and the row FEC packet are explained. In the Pro-MPEG, data packets to be transmitted are arranged in a matrix shape as shown in FIG. 2A and column FEC packets are generated by an xor operation of the data packet grouped in the vertical direction.

For example, a column FEC packet with a sequence number 1 is generated by an xor operation of data packets with sequence numbers 1, 11, 21, . . . , and 91.

As shown in FIG. 2B, data packets to be transmitted are arranged in a matrix shape and row FEC packets are generated by an xor operation of the data packets grouped in the horizontal direction. For example, a row FEC packet with a sequence number 2 is generated by an xor operation of data packets with sequence numbers 11 to 20.

In the Pro-MPEG, SNBase as a sequence number of a leading data packet among the grouped data packets, Offset as a difference between sequence numbers of data packets adjacent to each other, and NA as the number of the grouped data packets are included in a header of each of the FEC packets (an FEC header) as FEC parameters.

The FEC-parameter specifying unit 106 analyzes the FEC header and specifies the FEC parameters (SNBase, Offset, and NA).

The leading-FEC-packet specifying unit 107 specifies, on the basis of the specified FEC parameter, a leading column FEC packet and a leading row FEC packet, which are at the top (having smallest sequence numbers), among column FEC packets ad row FEC packets corresponding to the same data packet matrix.

For example, in the example shown in FIGS. 2A and 2B, the column FEC packet and the row FEC packet with the sequence number 1 are the leading column FEC packet and the leading row FEC packet. A method of specifying the leading column FEC packet and the leading row FEC packet is explained later.

The FEC-packet-group specifying unit 108 specifies, on the basis of the specified leading column FEC packet, leading row FEC packet, and FEC parameters, a column FEC packet group and a row FEC packet group corresponding to the same data packet matrix.

For example, in the example shown in FIGS. 2A and 2B, column FEC packets with sequence numbers 1 to 10 form a column FEC packet group and row FEC packets with sequence numbers 1 to 10 form a row FEC packet group.

The FEC-packet selecting unit 109 sequentially selects FEC packets belonging to the column FEC packet group and the row FEC packet group specified by the FEC-packet-group specifying unit 108.

The restorability judging unit 110 judges, referring to the data storage information stored in the data-storage-information storing unit 103, whether a loss of data packets related to an FEC packet selected by the FEC-packet selecting unit 109 can be restored. The restorability judging unit 110 detects whether data portions of the related data packets are stored in the data storing unit 102. When the number of lost data packets, data portions of which are not stored in the data storing unit 102, is one, the restorability judging unit 110 judges that the data packet is restorable. When the number of lost data packets is other than one, the restorability judging unit 110 judges that restoration is impossible.

Data packets related to an FEC packet are a data packet group used for generation of the FEC packet. For example, when a column FEC packet with a sequence number 3 in FIG. 2A is selected, data packets related to the column FEC packet are data packets with sequence numbers 3, 13, 23, . . . , and 93. When any one of the data packets with the sequence numbers 3, 13, 23, . . . , and 93 is lost, it is judged that the data packet is restorable. When no lost data packet is left or when two or more data packets are lost, it is judged that restoration is impossible.

When the restorability judging unit 110 judges that the data packet is restorable, the restorability judging unit 110 outputs a sequence number of the FEC packet, sequence numbers of the related data packets, and a restoration processing start signal to the data restoring unit 111.

The data restoring unit 111 performs, on the basis of the restoration processing start signal, restoration processing for the lost data packet judged as restorable by the restorability judging unit 110. The data restoring unit 111 extracts, on the basis of the sequence numbers given from the restorability judging unit 110, data of the FEC packet and data of the not-lost data packets from the data storing unit 102. The lost data packet can be restored by performing an xor operation of the FEC packet and the not-lost data packets.

For example, as shown in FIG. 3, when a loss of a data packet with a sequence number 40 is restored, an xor operation of data packets with sequence numbers 31 to 39 and a row FEC packet with a sequence number 4 is performed.

The data restoring unit 111 stores the restored data packet in the data storing unit 102. The data restoring unit 111 stores, in association with the sequence number of the restored data packet, in the data-storage-information storing unit 103, data storage information indicating that the restored data packet is stored in the data storing unit 102.

When the restoration of a data packet matrix by the data restoring unit 111 is finished, in other words, when there is no restorable data packet in the data packet matrix, the matrix updating unit 112 performs update of the matrix.

Figure 4:
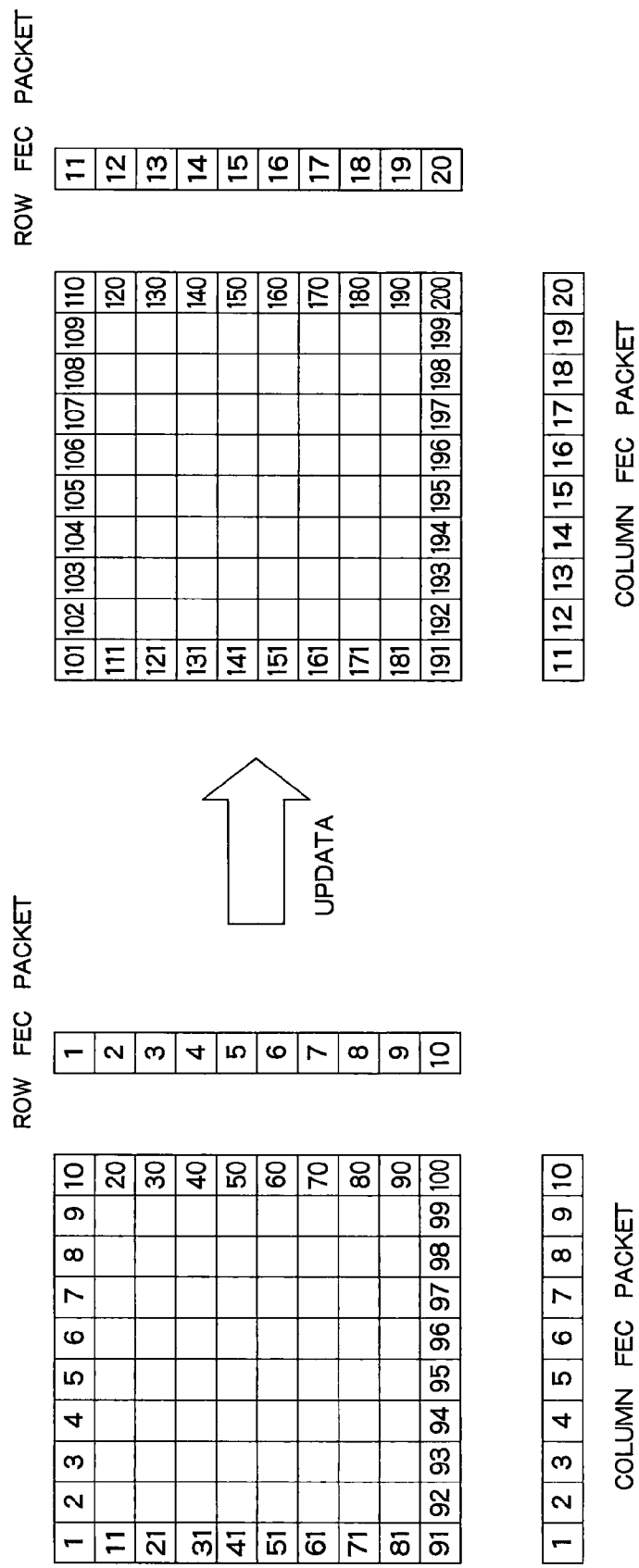
FIG. 4 is a diagram of an example of update of a matrix.

The update of the matrix is specifying column FEC packets and row FEC packets corresponding to the next data packet matrix. For example, as shown in FIG. 4, restoration processing for a matrix including data packets with sequence numbers 1 to 100 using column FEC packets with sequence numbers 1 to 10 and row FEC packets with sequence numbers 1 to 10 is finished, the matrix updating unit 112 specifies column FEC packets and row FEC packets with sequence numbers 11 to 20, which are FEC packets corresponding to the next packet matrix.

Restoration processing for the next matrix is performed by using the column FEC packets and the row FEC packets specified by the matrix updating unit 112.

Figure 5:
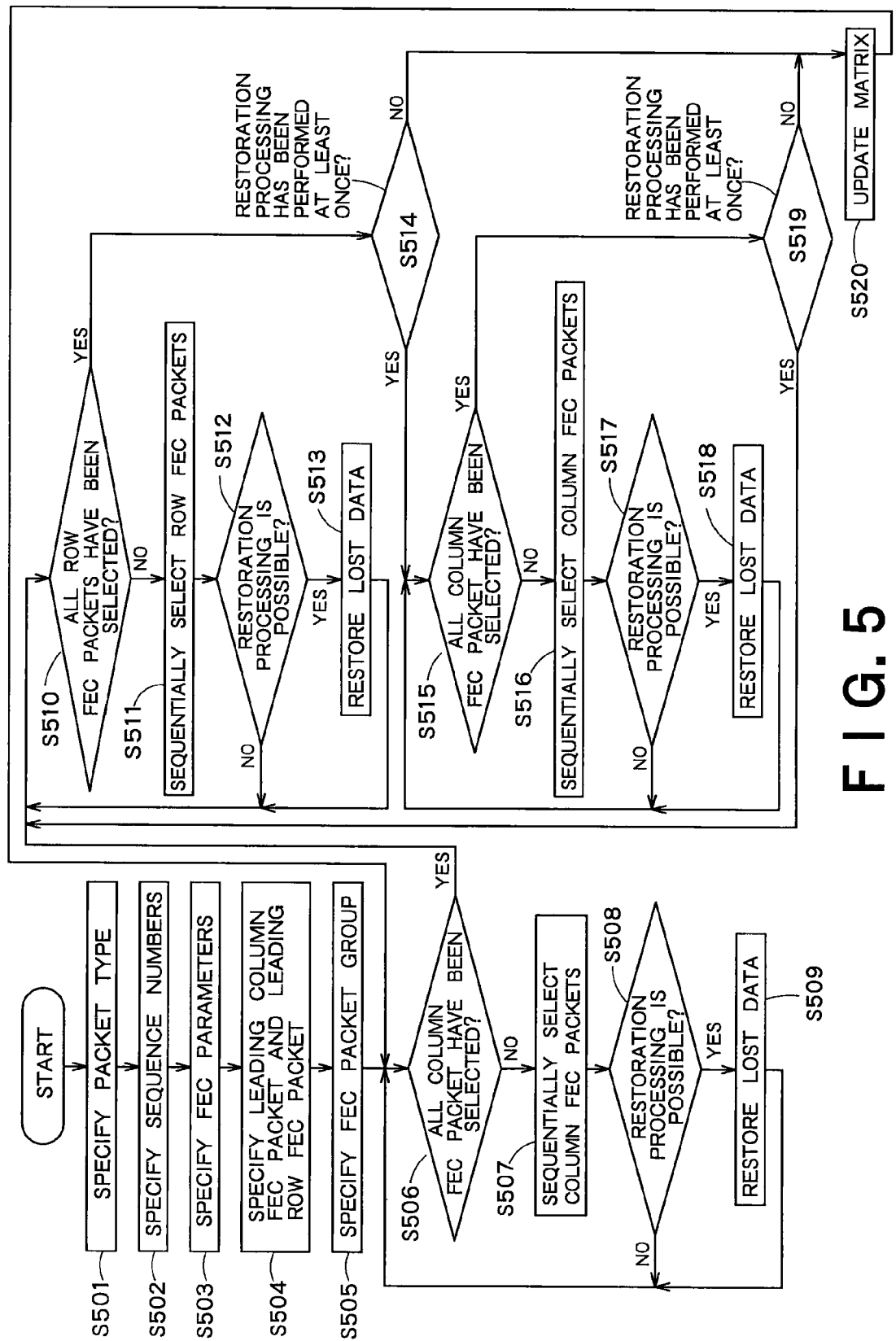
FIG. 5 is a flowchart for explaining a method of restoring lost data packets.

A method of restoring a lost data packet using such data receiving apparatus is explained with reference to a flowchart shown in FIG. 5.

(Step S501) The packet-type specifying unit 104 specifies whether received packets are data packets or FEC packets. When the received packets are the FEC packets, the packet-type specifying unit 104 specifies whether the FEC packets are column FEC packets or row FEC packets.

(Step S502) The sequence-number specifying unit 105 specifies sequence numbers of the respective packets.

(Step S503) The FEC-parameter specifying unit 106 specifies FEC parameters (SNBase, Offset, and NA) from FEC headers of the FEC packets.

(Step S504) The leading-FEC-packet specifying unit 107 specifies, on the basis of the specified FEC parameters, a leading column FEC packet and a leading row FEC packet. A method of specifying a leading column FEC packet and a leading row FEC packet is explained below. In the method, SNBases of column FEC packets and SNBases of row FEC packets is explained below.

A data packet at the top of grouped data packets used for generation of a leading column FEC packet and a data packet at the top of grouped data packets used for generation of a leading row FEC packet are the same. In other words, SNBase of a leading column FEC packet and SNBase of a leading row FEC packet corresponding to the same data packet matrix always coincide with each other.

Figure 6:
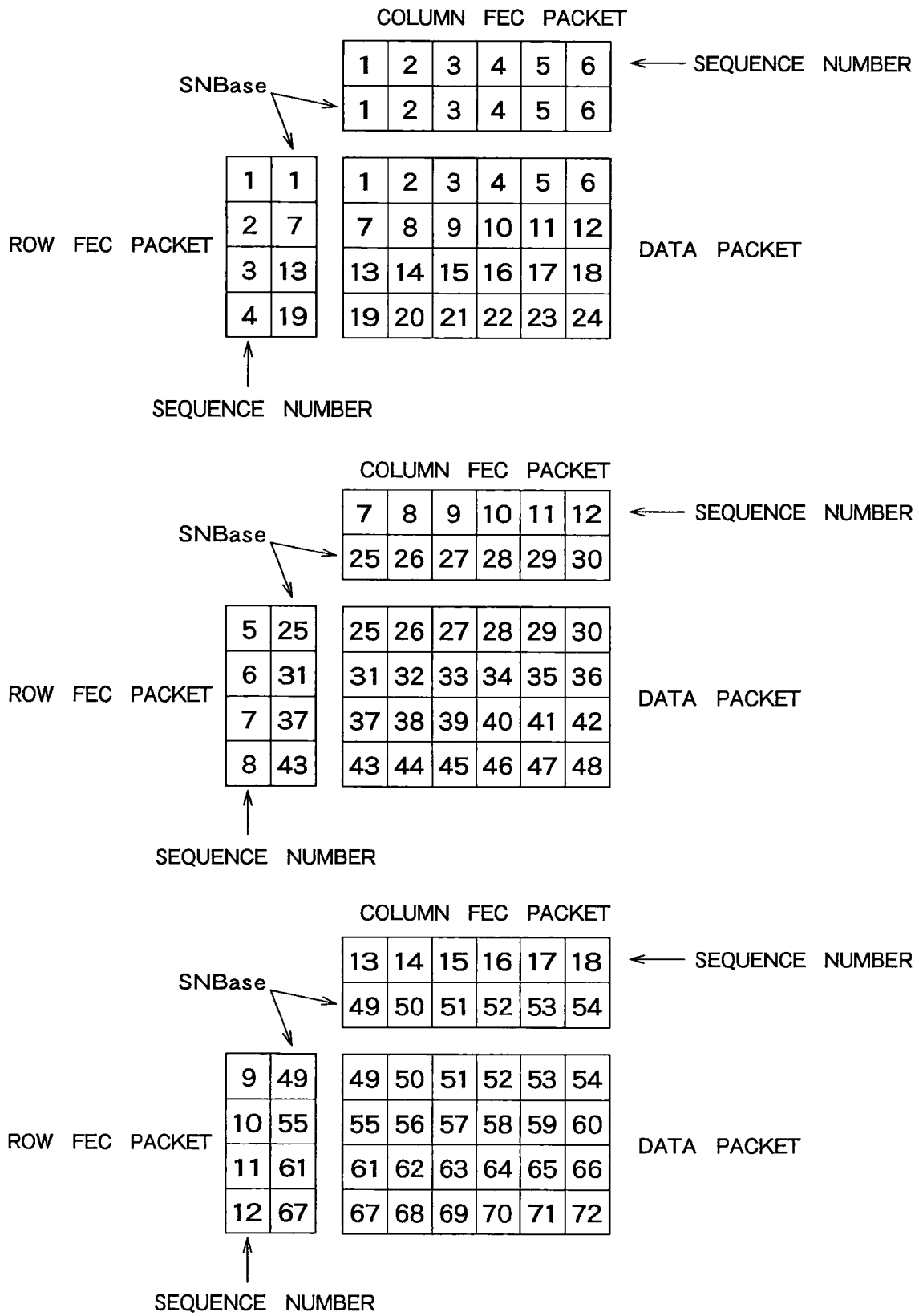
FIG. 6 is a diagram of an example of SNBases of FEC packets.

Sequence numbers and SNBases of FEC packets in the case in which data packets with sequence numbers 1 to 72 are arranged in matrixes of four packets in the vertical direction and six packets in the horizontal direction are shown in FIG. 6. As it is seen from this figure, both SNBases of a leading column FEC packet and a leading row FEC packet of a first matrix are 1. In a second matrix, both the SNBases are 25 and, in a third matrix, both the SNBases are 49.

Therefore, when the SNBases of the received column FEC packets and the SNBases of the received row FEC packets are compared, it is possible to specify that a column FEC packet and a row FEC packet having the same comparison result are a leading column FEC packet and a leading row FEC packet, respectively.

(Step S505) The FEC-packet-group specifying unit 108 specifies an FEC packet group corresponding to a matrix same as a matrix of the specified leading column FEC packet and leading row FEC packet.

The vertical length of the matrix is represented by NA of the column FEC packets and the horizontal length thereof is represented by Offsets of the column FEC packets (or NA of the row FEC packets). Therefore, in order of the sequence numbers from the leading column FEC packet, column FEC packets equivalent to the horizontal length of the matrix, i.e., the number of Offsets of the column FEC packets (or NA of the row FEC packets) are specified as a column FEC packet group corresponding to the same matrix.

Similarly, in order of the sequence numbers from the leading row FEC packet, row FEC packets equivalent to the vertical length of the matrix, that is, the number of NA of the column FEC packets are specified as a row FEC packet group corresponding to the same matrix.

(Step S506) It is judged whether all the column FEC packets have been selected. When all the column FEC packets have been selected, the processing proceeds to step S510. When all the column FEC packets have not been selected, the processing proceeds to step S507.

(Step S507) The FEC-packet selecting unit 109 selects the column FEC packets in order of the sequence numbers.

(Step S508) The restorability judging unit 110 judges whether restoration processing can be performed by using the selected column FEC packets. In other words, the restorability judging unit 110 judges, on the basis of the data storage information stored in the data-storage-information storing unit 103, whether the number of lost data packets included in a data packet group corresponding to the selected column FEC packets is one.

When the restoration processing can be performed, the processing proceeds to step S509. When the restoration processing cannot be performed, the processing returns to step S506.

(Step S509) The data restoring unit 111 performs restoration processing for the lost data packet.

(Step S510) It is judged whether all the row FEC packets have been selected. When all the row FEC packets have been selected, the processing proceeds to step S515. When all the row FEC packets have not been selected, the processing proceeds to step S511.

(Step S511) The FEC-packet selecting unit 109 selects the row FEC packets in order of the sequence numbers.

(Step S512) The restorability judging unit 110 judges whether restoration processing can be performed by using the selected row FEC packet. In other words, the restorability judging unit 110 judges, on the basis of the data storage information stored in the data-storage-information storing unit 103, whether the number of lost data packets included in a data packet group corresponding to the selected row FEC packet is one.

When the restoration processing can be performed, the processing proceeds to step S513. When the restoration processing cannot be performed, the processing returns to step S510.

(Step S513) The data restoring unit 111 performs restoration processing for the lost data packet.

(step S514) It is judged whether the restoration processing using the row FEC packet has been performed at least once. When the restoration processing has been performed at least once, the processing proceeds to step S515. When the restoration processing has not been performed at least once, the processing proceeds to step S520.

(Step S515) It is judged whether all the column FEC packets have been selected. When all the column FEC packets have been selected, the processing proceeds to step S519. When all the column FEC packets have not been selected, the processing proceeds to step S516.

(Step S516) The FEC-packet selecting unit 109 selects the column FEC packets in order of the sequence numbers.

(Step S517) The restorability judging unit 110 judges whether restoration processing can be performed by using the selected column FEC packet. When the restoration processing can be performed, the processing proceeds to step S518. When the restoration processing cannot be performed, the processing returns to step S515.

(Step S518) The data restoring unit 111 performs restoration processing for the lost data packet.

(Step S519) It is judged whether restoration processing using the column FEC packet has been performed at least once. When the restoration processing has been performed at least once, the processing returns to step S510. When the restoration processing has not been performed at least once, the processing proceeds to step S520.

(Step S520) When no restorable data packet is left in a matrix, it is judged that restoration processing for the matrix is finished. The matrix updating unit 112 updates the matrix to the next matrix. An FEC packet group corresponding to the next matrix includes the same number of FEC packets following in order of the sequence numbers of the FEC packet group already specified. Therefore, the FEC packet group can be easily specified.

In steps S506 to S519, all the column FEC packets are sequentially selected. Thereafter, all the row FEC packets are sequentially selected. At a stage when all the row FEC packets are selected, it is checked whether restoration has been performed by using the row FEC packet.

When the restoration using the row FEC packet has not been performed, the processing for the matrix is finished and the processing shifts to the next matrix. When the restoration using the row FEC packet has been performed, the processing shifts to the processing by the column FEC packet again and the same processing is repeated.

Such repeated processing is performed because, when restoration by one of the column FEC packet and the row FEC packet is performed, a portion that cannot be restored by the other FEC packet may be able to be restored.

Figures 7A, 7B, 7C, 7D:
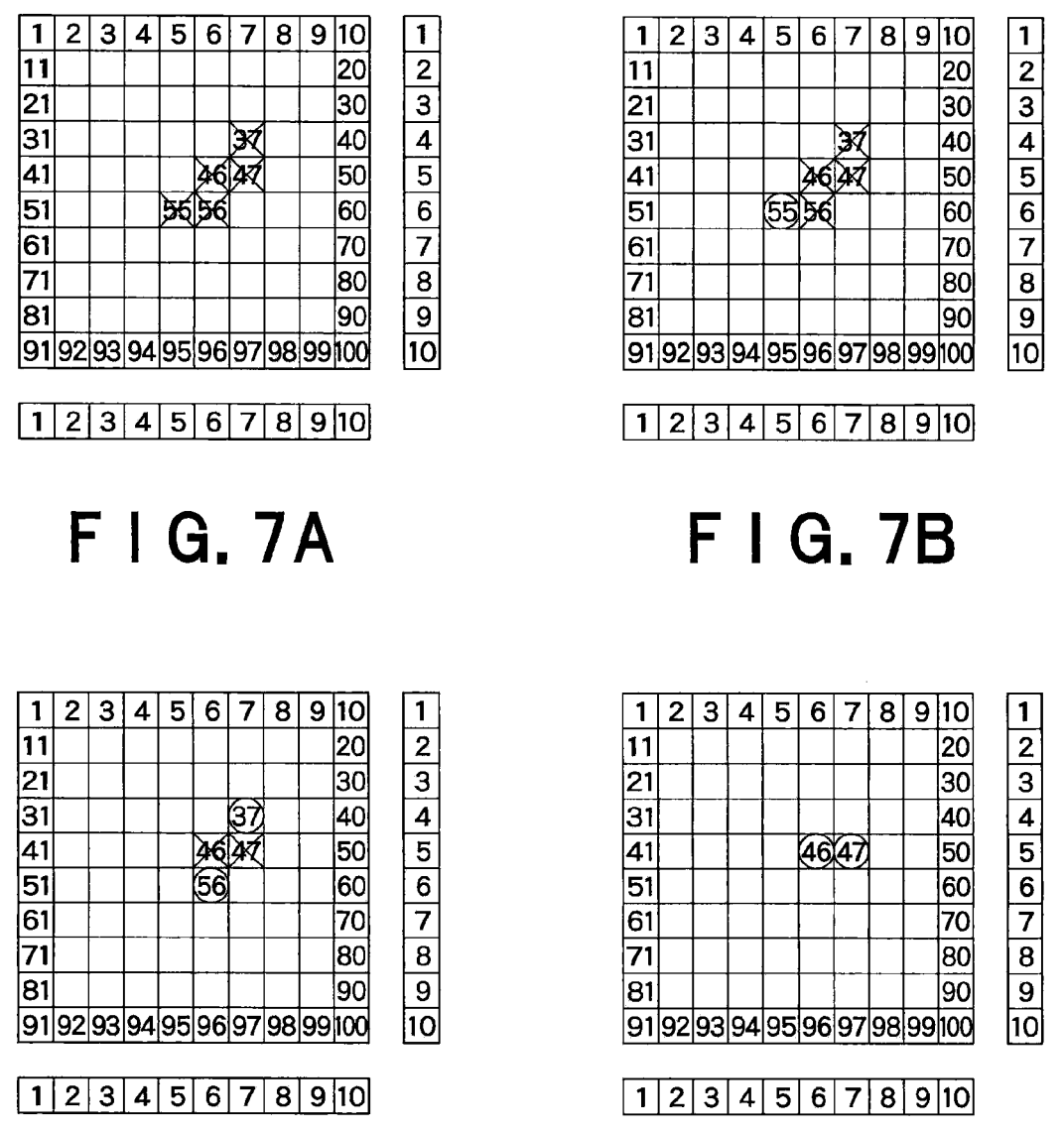

For example, as shown in FIG. 7A, it is assumed that data packets with sequence numbers 37, 46, 47, 55, and 56 are lost among matrixes including data packets with sequence numbers 1 to 100.

First, column FEC packets are sequentially selected. As shown in FIG. 7B, the data packet with the sequence number 55 is restored by using a column FEC packet with a sequence number 5. Restoration processing cannot be performed for column FEC packets with sequence numbers 6 and 7 because there are two lost data packets in a data packet group corresponding thereto.

Subsequently, row FEC packets are sequentially selected. As shown in FIG. 7C, the data packet with the sequence number 37 is restored by using a row FEC packet with a sequence number 4. The data packet with the sequence number 56 is restored by using a row FEC packet with a sequence number 6.

Lost data packets included in a data packet group corresponding to the column FEC packets with the sequence numbers 6 and 7 are reduced to one by the restoration processing using the row FEC packet. Therefore, the restoration processing can be performed. As shown in FIG. 7D, data packets with sequence numbers 46 and 47 are restored.

The data processing apparatus according to this embodiment can efficiently specify, on the basis of FEC parameters, a column FEC packet group and a row FEC packet group corresponding to the same data packet matrix and can efficiently perform restoration processing. It is possible to prevent restoration omissions by performing repeated restoration processing between the column FEC packet group and the row FEC packet group.

Another example of the method of restoring a lost data packet is explained with reference to a flowchart shown in FIG. 8. Steps S801 to S809 are the same as steps S501 to S509 of the lost data packet restoring method according to the embodiment explained above. Therefore, explanation of the steps is omitted.

(Step S810) It is judged whether all the row FEC packets have been selected. When all the row FEC packets have been selected, the processing proceeds to step S817. When all the row FEC packets have not been selected, the processing proceeds to step S811.

(Step S811) The FEC-packet selecting unit 109 selects the row FEC packets in order of the sequence numbers.

(Step S812) The restorability judging unit 110 judges whether restoration processing can be performed by using the selected row FEC packet. When the restoration processing can be performed, the processing proceeds to step S813. When the restoration processing cannot be performed, the processing returns to step S810.

(Step S813) The data restoring unit 111 performs restoration processing for the lost data packet.

(Step S814) When mth data packet in order of the sequence numbers among the data packet group is restored by using the row FEC packet in the preceding step, mth column FEC packet in order of the sequence numbers is selected. "m" is an integer satisfying $1 \leq m \leq$ the number of packets in the horizontal direction of a matrix.

When nth data packet in order of the sequence numbers among the data packet group is restored by using the column FEC packet in the preceding step, nth row FEC packet in order of the sequence numbers is selected. "n" is an integer satisfying $1 \leq n \leq$ the number of packets in the vertical direction of the matrix.

(Step S815) The restorability judging unit 110 judges whether restoration processing can be performed by using the FEC packet selected in step S814. When the restoration processing can be performed, the processing proceeds to step S816. When the restoration processing cannot be performed, the processing returns to step S810.

(Step S816) The data restoring unit 111 performs restoration processing for the lost data packet. The processing returns to step S814.

(Step S817) When no restorable data packet is left in a matrix, it is judged that restoration processing for the matrix is finished. The matrix updating unit 112 updates the matrix to the next matrix.

An example of restoration of a lost data packet by such a method is shown in FIG. 9. A matrix in a state in which it is judged in step S806 that all the column FEC packets have been selected is shown in FIG. 9A. First, a row FEC packet with a sequence number 1 is selected. Since there is no lost data packet included in a data packet group corresponding to the row FEC packet, restoration processing is not performed.

Figure 9A:
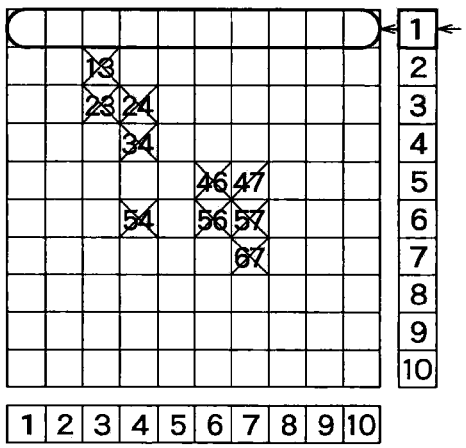
FIGS. 9A to 9F are diagrams of another example of the processing for restoring lost data packets.
Figure 9B:
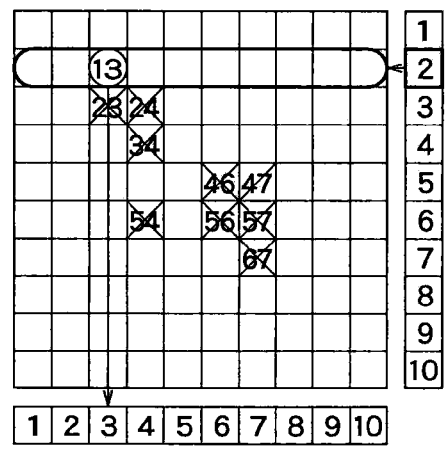

As shown in FIG. 9B, a row FEC packet with a sequence number 2 is selected and a data packet with a sequence number 13 is restored. The restored data packet is a third data packet in order of the sequence numbers in the data packet group. Therefore, a column FEC packet with a sequence number 3 is selected next.

Figure 9C:
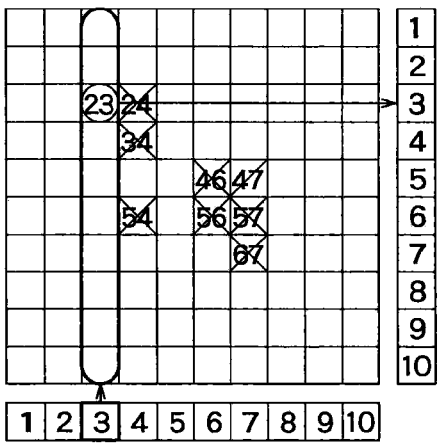

As shown in FIG. 9C, a data packet with a sequence number 23 is restored. The restored packet is a third data packet in order of the sequence numbers in the data packet group. Therefore, a row FEC packet with a sequence number 3 is selected next.

Figure 9D:
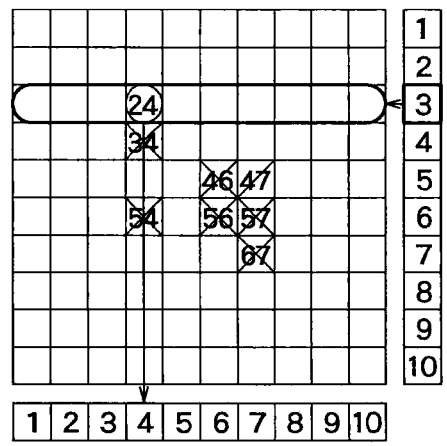

As shown in FIG. 9D, a data packet with a sequence number 24 is restored. The restored data packet is a fourth data packet in order of the sequence numbers in the data packet group. Therefore, a column FEC packet with a sequence number 4 is selected next.

Figure 9E:
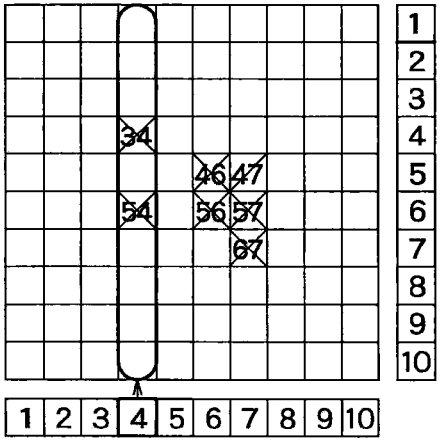
Figure 9F:
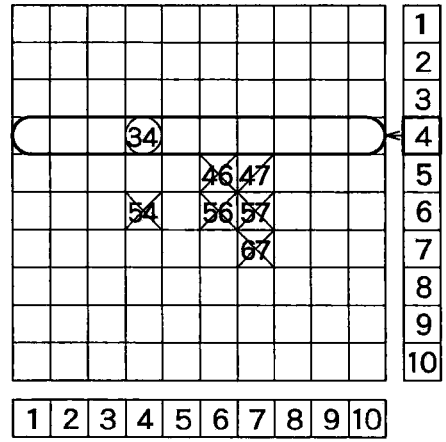

As shown in FIG. 9E, two lost data packets are included in a data packet group corresponding to the column FEC packet with the sequence number 4. Therefore, restoration processing is not performed. Referring back to the selection of a row FEC packet, as shown in FIG. 9F, a row FEC packet with a sequence number 4 is selected. Thereafter, same processing is repeated to prevent restoration omissions.

When the restoration processing by one of the row FEC packet and the column FEC packet is performed, the other of the row FEC packet and the column FEC packet corresponding to the restored data packet is selected. If the data packet is restorable, restoration processing is performed. Since the FEC packets are selected in this way, it is possible to further reduce the number of times of selection of FEC packets and more efficiently perform restoration of data than the method of selecting all the other FEC packets every time the restoration is performed as shown in FIG. 5.

Figure 8:
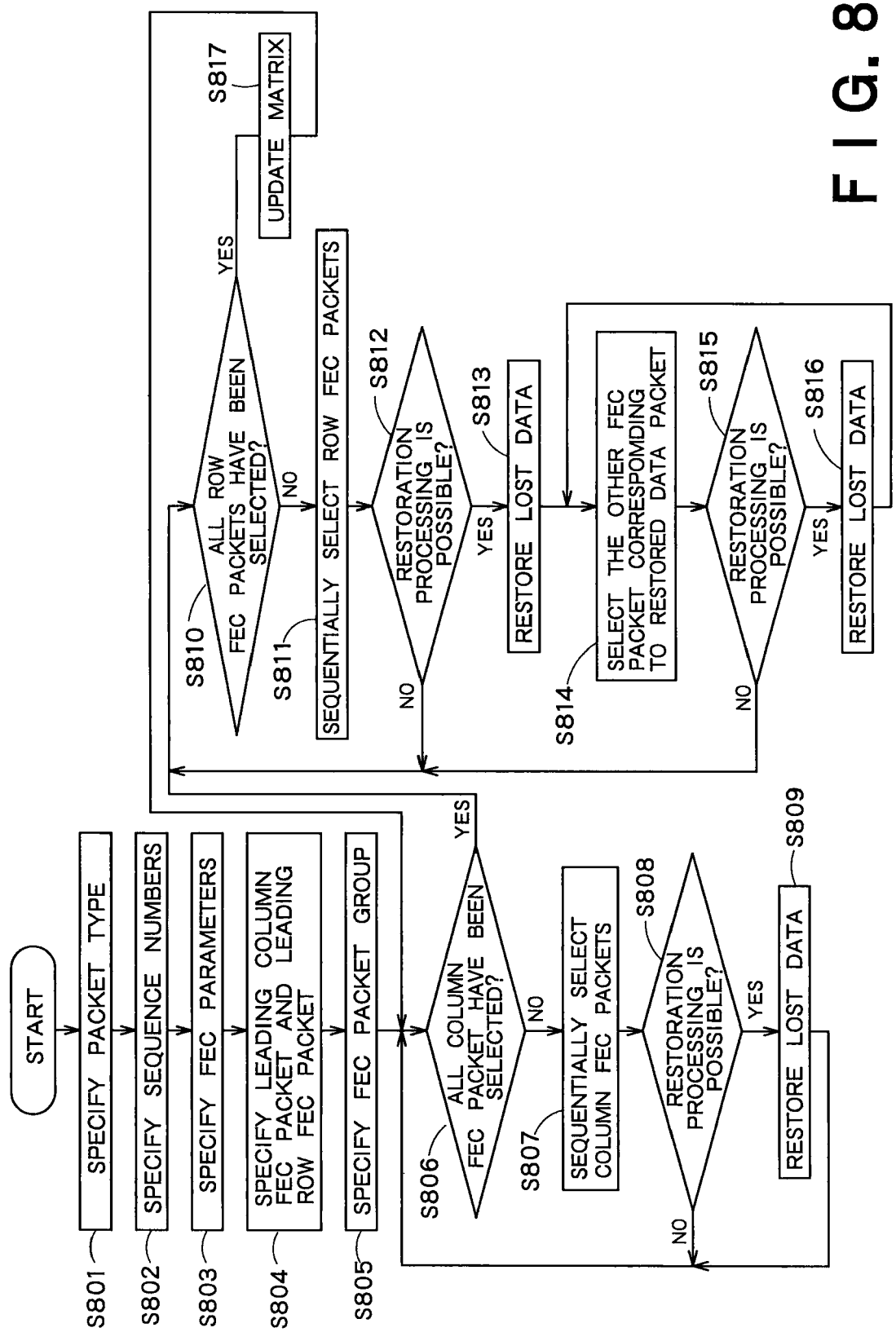
FIG. 8 is a flowchart for explaining another example of the method of restoring lost data packets.
Figure 10:
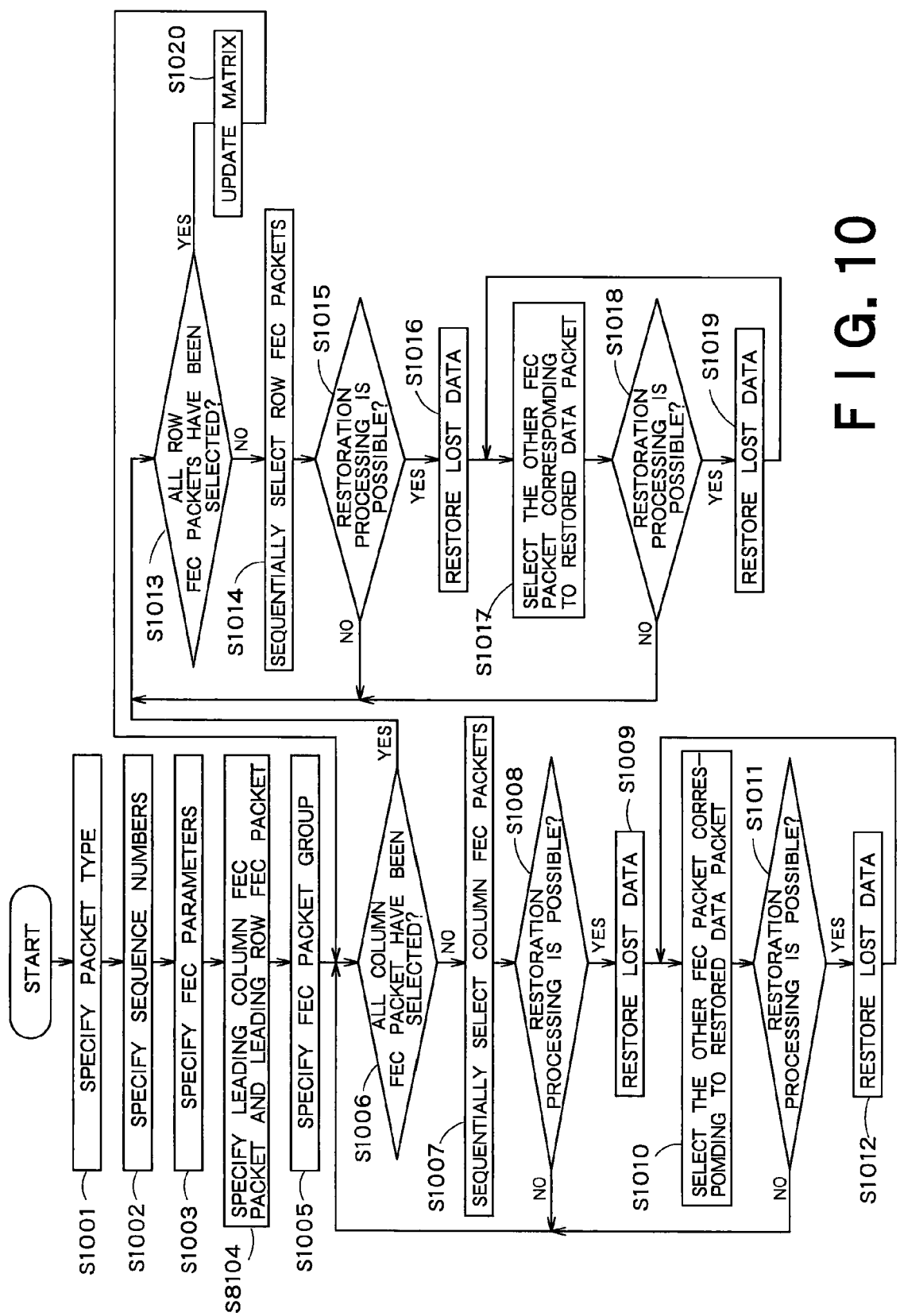
FIG. 10 is a flowchart for explaining still another example of the method of restoring lost data packets.

In the method shown in FIG. 8, all the FEC packets are once selected in order first (steps S806 to S809). However, as shown in FIG. 10, even when column FEC packets are selected in order first, the processing may shift to repeated processing when restoration is performed (steps S1010 to S1012).

Figure 11:
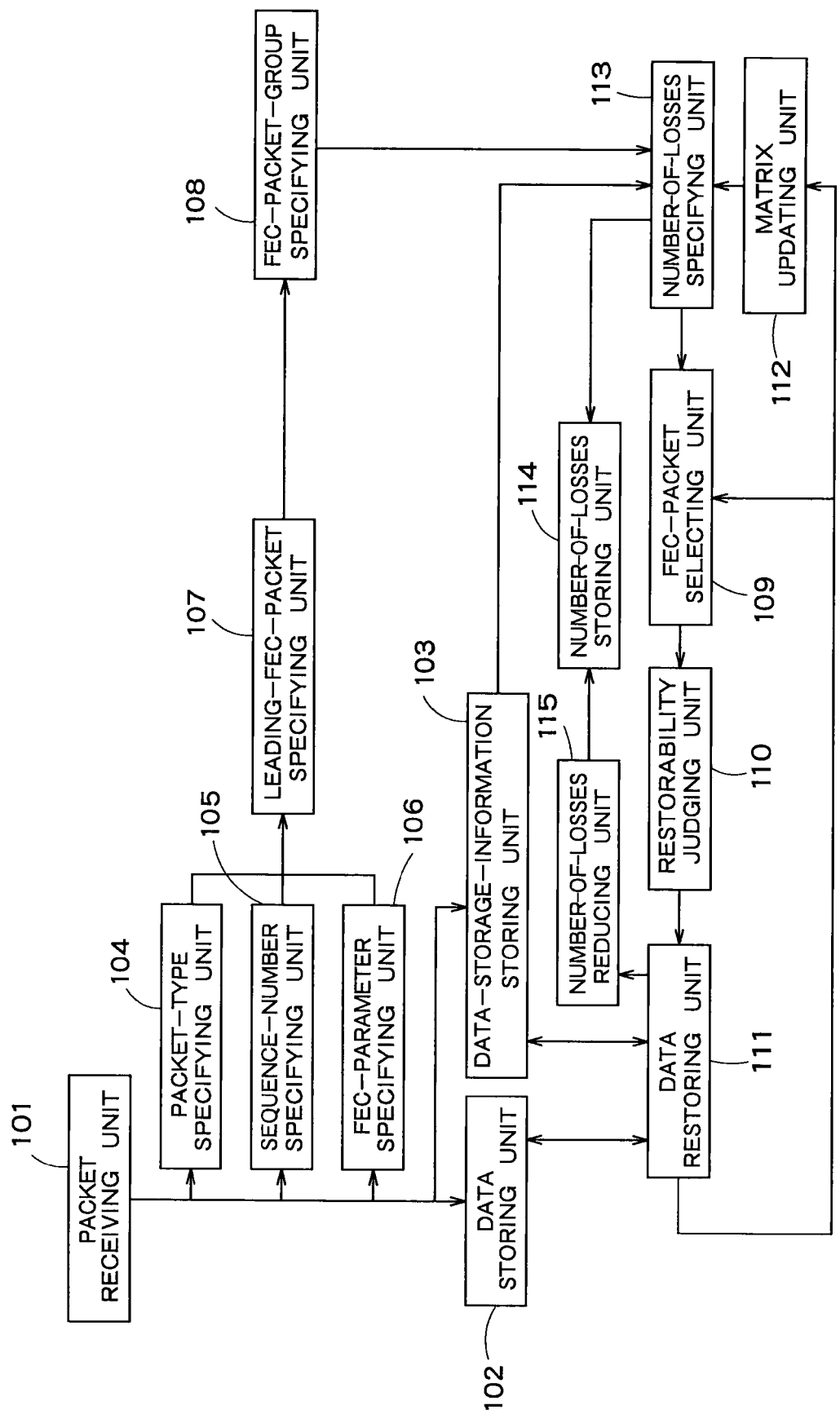
FIG. 11 is a schematic diagram of a data receiving apparatus according to a modification.

As shown in FIG. 11, the data receiving apparatus may further include a number-of-losses specifying unit 113 that specifies a number of losses of a data packet group corresponding to FEC packets in a matrix, a number-of-losses storing unit 114 that stores the specified number of losses, and a number-of-losses reducing unit 115 that reduces the stored number of losses by one.

Figure 12:
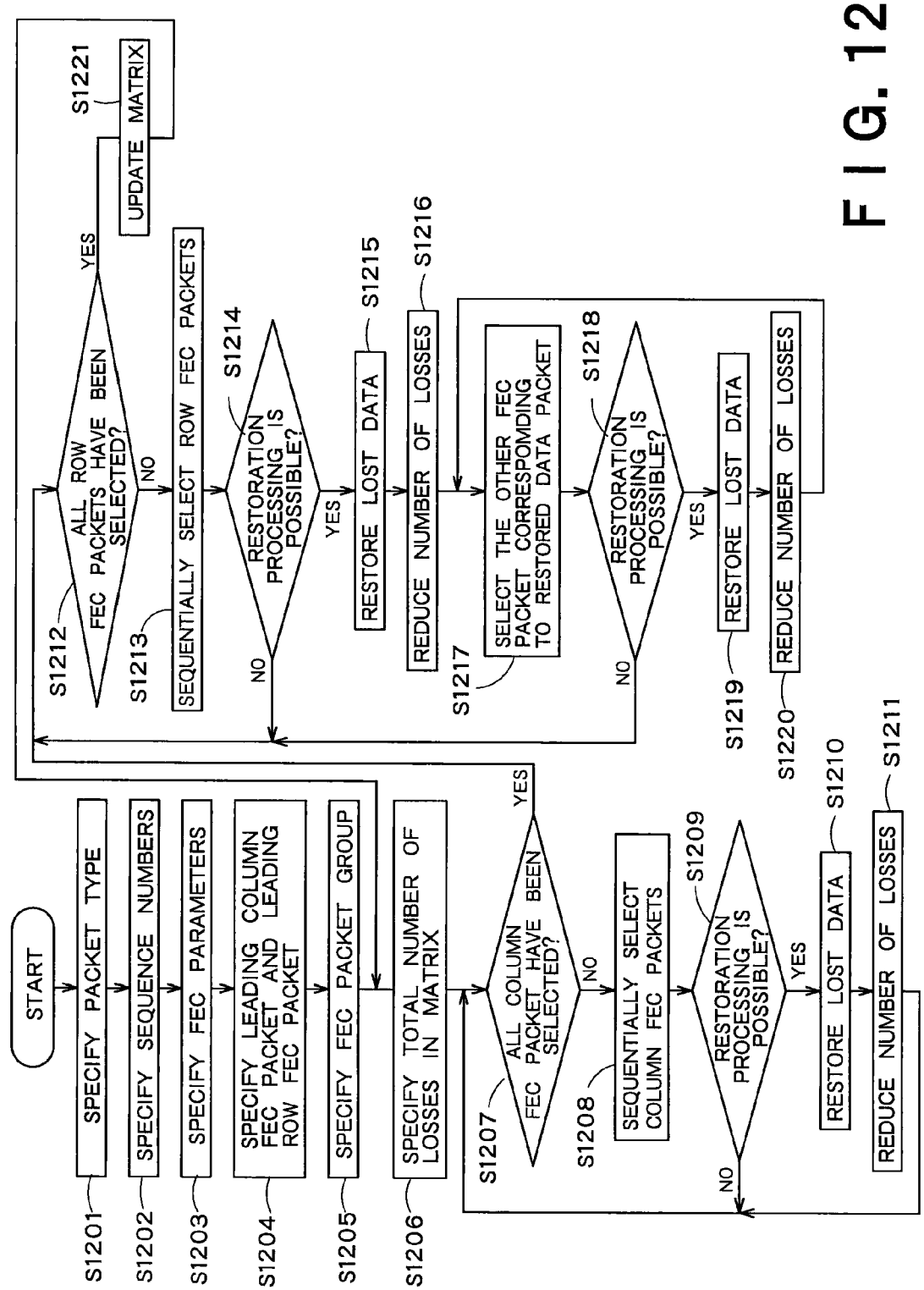
FIG. 12 is a flowchart for explaining still another example of the method of restoring lost data packets.

A method of restoring a lost data packet using such a data receiving apparatus is explained with reference to a flowchart shown in FIG. 12. Steps S1201 to S1205 are the same as steps S501 to S505 of the lost data packet restoring method according to the embodiment explained above. Therefore, explanation of the steps is omitted.

Figure 13:
FIG. 13 is a diagram of an example of the number of losses.
Figure 13:
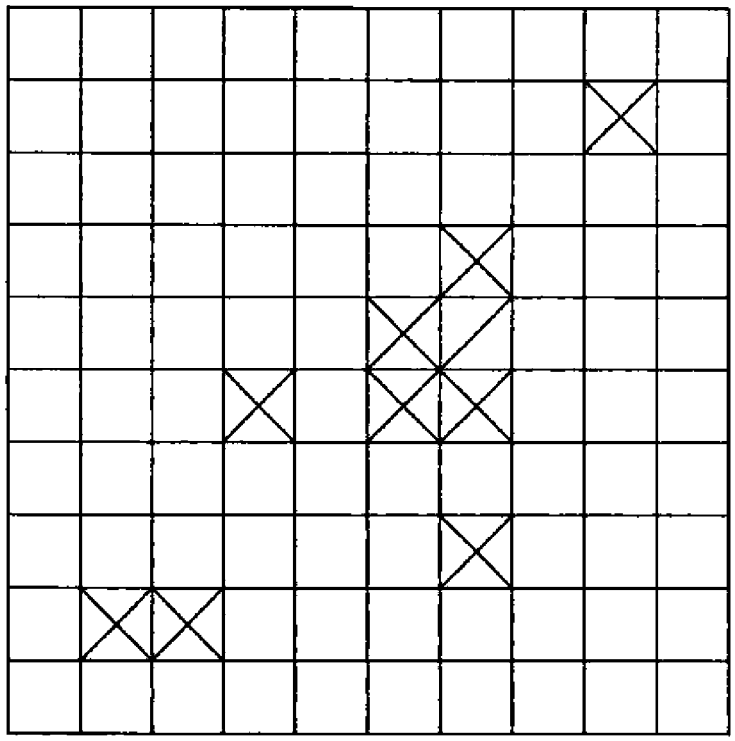

(Step S1206) The number-of-losses specifying unit 113 specifies, referring to the data storage information stored in the data-storage-information storing unit 103, the number of losses included in a data packet group corresponding to each of all FEC packets belonging to a matrix. The specified number of losses is stored in the number-of-losses storing unit 114. An example of the number of losses is shown in FIG. 13.

(Step S1207) It is judged whether all the column FEC packets have been selected. When all the column FEC packets have been selected, the processing proceeds to step S1212. When all the column FEC packets have not been selected, the processing proceeds to step S1208.

(Step S1208) The FEC-packet selecting unit 109 selects column FEC packets in order of sequence numbers.

(Step S1209) It is judged whether restoration processing can be performed by using the selected column FEC packet. The restorability judging unit 110 judges, on the basis of the information stored in the number-of-losses storing unit 114, whether the number of losses corresponding to the selected column FEC packet is one.

When the restoration processing can be performed, the processing proceeds to step S1210. When the restoration processing cannot be performed, the processing returns to step S1207.

(Step S1210) The data restoring unit 111 performs restoration processing for a lost data packet.

(Step S1211) The number-of-losses reducing unit 115 reduces the number of losses of column FEC packets and row FEC packets corresponding to the data packet restored in step S1210, which is stored in the number-of-losses storing unit 114, by one.

(Step S1212) It is judged whether all the row FEC packets have been selected. When all the row FEC packets have been selected, the processing proceeds to step S1221. When all the row FEC packets have not been selected, the processing proceeds to step S1213.

(Step S1213) The FEC-packet selecting unit 109 selects row FEC packets in order of sequence numbers.

(Step S1214) It is judged whether restoration processing can be performed by using the selected row FEC packet. The restorability judging unit 110 judges, on the basis of the information stored in the number-of-losses storing unit 114, whether the number of losses corresponding to the selected row FEC packet is one.

When the restoration processing can be performed, the processing proceeds to step S1215. When the restoration processing cannot be performed, the processing returns to step S1212.

(Step S1215) The data restoring unit 111 performs restoration processing for a lost data packet.

(Step S1216) The number-of-losses reducing unit 115 reduces the number of losses of column FEC packets and row FEC packets corresponding to the data packet restored in step S1215, which is stored in the number-of-losses storing unit 114, by one.

(Step S1217) When mth data packet in order of the sequence numbers among the data packet group is restored by using the row FEC packet in the preceding step, mth column FEC packet in order of the sequence numbers is selected. "m" is an integer satisfying $1 \leq m \leq$ the number of packets in the horizontal direction of a matrix.

When nth data packet in order of the sequence numbers among the data packet group is restored by using the column FEC packet in the preceding step, nth row FEC packet in order of the sequence number is selected. "n" is an integer satisfying $1 \leq n \leq$ the number of packets in the vertical direction of the matrix.

(Step S1218) It is judged whether the number of losses corresponding to the FEC packet selected in step S1217 is one. When the number of losses is one and restoration processing can be performed, the processing proceeds to step S1219. When the number of losses is other than one and restoration processing cannot be performed, the processing returns to step S1212.

(Step S1219) The data restoring unit 111 performs restoration processing for a lost data packet.

(Step S1220) The number-of-losses reducing unit 115 reduces the number of losses of column FEC packets and row FEC packets corresponding to the data packet restored in step S1219, which is stored in the number-of-losses storing unit 114, by one.

(Step S1221) When no restorable data packet is left in a matrix, it is judged that restoration processing for the matrix is finished. The matrix updating unit 112 updates the matrix to the next matrix.

An example of restoration of a lost data packet by such a method is shown in FIG. 14. A matrix in a state in which it is judged in step S1207 that all the column FEC packets have been selected is shown in FIG. 14A. First, a row FEC packet with a sequence number 1 is selected. Since the number of losses stored in the number-of-losses storing unit 114 is zero, restoration processing is not performed.

Subsequently, as shown in FIG. 14B, a row FEC packet with a sequence number 2 is selected and the number of losses stored in the number-of-losses storing unit 114 is checked. Since the number of losses is one, restoration processing is performed and a data packet with a sequence number 13 is restored.

According to the restoration of the data packet with the sequence number 13, the number of losses of the row FEC packets with the sequence number 2 and the column FEC packet with the sequence number 3 corresponding to the data packet is reduced by one.

The restored data packet with the sequence number 13 is a third data packet in order of the sequence numbers in the data packet group. Therefore, as shown in FIG. 14C, a column FEC packet with a sequence number 3 is selected.

The number of losses of the column FEC packet with the sequence number 3 is one. Therefore, restoration processing is performed and a data packet with a sequence number 23 is restored. According to the restoration processing, the number of losses of the column FEC packet and the row FEC packet with the sequence number 3 is reduced by one.

The restored data packet is a third data packet in order of the sequence numbers in the data packet group. Therefore, as shown in FIG. 14D, a row FEC packet with a sequence number 3 is selected.

The number of losses of the row FEC packet with the sequence number 3 is one. Therefore, restoration processing is performed. According to the restoration processing, the number of losses of the row FEC packet with the sequence number 3 and the column FEC packet with the sequence number 4 is reduced by one.

Subsequently, as shown in FIG. 14E, a column FEC packet with a sequence number 4 is selected. Since the number of losses of the column FEC packet is two, restoration processing is not performed. As shown in FIG. 14F, a row FEC packet with a sequence number 4 is selected. Thereafter, the same processing is repeated to prevent restoration omissions.

In the data receiving apparatus shown in FIG. 1, the restorability judging unit 110 accesses the data-storage-information storing unit 103, detects whether a data portion of each of plural data packets corresponding to a selected FEC packet is stored in the data storing unit 102, and judges restorability.

On the other hand, in the data receiving apparatus shown in FIG. 11, the restorability judging unit 110 can judge restorability simply by accessing the number-of-losses storing unit 114 and detecting whether the number of losses corresponding to a selected FEC packet is one. Therefore, it is possible to further improve efficiency of processing.

In the example explained above, the number of losses is specified at a stage when an FEC packet group is specified or a matrix is updated. However, this is only an example and the present invention is not limited to such an example.

For example, when column FEC packets are sequentially processed first, the restorability judging unit 110 accesses the data-storage-information storing unit 103 and stores the number of losses specified as the number of losses to be specified at that point in the number-of-losses storing unit 114. When row FEC packets are sequentially processed, the processing explained above may be performed by using the number of losses stored in the number-of-losses storing unit 114.

When the restorability judging unit 110 judges that the data packet is restorable, the data restoring unit 111 needs to specify, in performing restoration, which data packet of a corresponding data packet group is lost and accesses the data-storage-information storing unit 103.

In order to reduce overhead of this access, the data-storage-information storing unit 103 and the data storing unit 102 may be arranged on the same memory to store data storage information and information of a data portion corresponding thereto in adjacent addresses on the memory.

When restoration processing is performed, for an arithmetic operation for restoration in FEC, all data are always read out. Therefore, it is suitable to arrange the data storage information in a position adjacent to the information of the data portion, for example, in front of the corresponding data as shown in FIG. 15. This makes it possible to collectively read out the data storage information and the information of the data portion in a burst-like manner and hold down the number of clock cycles required for reading out the data storage information (normally, one).

When a result of reading out the data storage information is zero, it is seen that the data storage information is lost data and the information of the data portion to be read out following the data storage information is invalid. Therefore, at a point when the result of reading out the data storage information is zero, the burst-like readout of the following information of the data portion may be suspended. By adopting such a memory structure, it is possible to further improve efficiency of restoration processing.

The selection patterns for an FEC packet by the FEC-packet selecting unit 109 explained above are examples only. Selection patterns are not limited to these patterns. In particular, in these selection patterns, the column FEC packets and the row FEC packets may be interchanged and processed in any order.

In the embodiment explained above, SNBases of the received column FEC packets and SNBases of the received row FEC packets are compared and an FEC packet having the same SNBase is specified as the leading FEC packet. However, a leading FEC packet may be specified by other methods.

For example, it is also possible to check whether a difference between SNBase of a received arbitrary column FEC packet and SNBase of a received arbitrary row FEC packet is Offset×k (k is an integer) of a column FEC packet and, when the difference is Offset×k, specify the column FEC packet as a leading column FEC packet.

This may be checked by sequentially changing "k". It may be checked whether the difference can be divided by Offset (a remainder is 0). For example, in the case of FIG. 6, it is seen that, whereas the column FEC packets with the sequence numbers 1, 7, and 13 are leading column FEC packets, SNBases of the column FEC packets are 1, 25, and 49 and all differences between the SNBases and SNBases 1, 7, 13, 19, 25, 31, 37, 43, 49, 55, 61, 67, . . . of row FEC packets can be divided by Offset 6.

It is also possible to specify a leading column FEC packet using SNBases of two column FEC packets without using a row FEC packet. Values of the SNBases of the column FEC packets are continuous if the column FEC packets belong to the same matrix.

Therefore, it is seen that, when column FEC packets are arranged in order of sequence numbers, the column FEC packets belong to the same matrix as long as SNBases are continuous and, when SNBases are discontinuous (values are missing), the matrix changes to the next matrix from a point where the SNBases are discontinuous.

For example, in FIG. 6, it is seen that, whereas the column FEC packets with the sequence numbers 1 to 6, 7 to 12, and 13 to 18 are continuous, SNBases of the column FEC packets with the sequence numbers 6 and 7 and sequence numbers 12 and 13 are 6 and 25 and 30 and 49, respectively, and are discontinuous.

Therefore, column FEC packets with continuous sequence numbers are compared and, when SNBases are discontinuous, it is possible to specify that an FEC packet with a larger sequence number is a leading column FEC packet.

For example, when two FEC packets continuously received (e.g., sequence numbers are not always continuous if the FEC packets are transmitted through an IP network) are compared, first, a sequence number and SNBase are stored every time an FEC packet is received. Every time a column FEC packet is received, it is checked whether a sequence number of the received column FEC packet is a sequence number of a stored column FEC packet received immediately preceding the column FEC packet+1 and SNBase of the column FEC packet is not stored SNBase of the column FEC packet received immediately preceding the column FEC packet+1. When the sequence number is +1 (continuous) and the SNBase is not +1 (discontinuous), the column FEC packet received anew is specified as a leading column FEC packet of a matrix.

SNBase of a column FEC packet at the top of the matrix represents a sequence number of a data packet at the top. The sequence number is a sequence number of a data packet at the end of an immediately preceding matrix+1. A sequence number of a data packet at the end of the matrix can be calculated as SNBase of a column FEC packet at the end of the matrix+Offset×(NA−1).

Therefore, it can be said that a difference between SNBase of the column FEC packet at the end of the matrix and SNBase of a column FEC packet at the top of the next matrix is always SNBase+Offset×(NA−1)+1.

For example, in the case of FIG. 6, SNBases of first column FEC packets at the end of a first matrix and at the beginning of a second matrix are 6 and 25, respectively, and SNBases of first column FEC packets at the end of the second matrix and at the beginning of a third matrix are 30 and 49. Both differences between the SBases are 19. It is seen that the differences are 6×(4−1)+1. When this check is performed, a leading column FEC packet of a matrix can be specified by comparing only SNBases without using sequence numbers.

For example, when two column FEC packets to be continuously received are compared, first, SNBase of a column FEC packet is stored every time the column FEC packet is received. Every time a column FEC packet is received, it is checked whether a difference between SNBase of the received column FEC packet and stored SNBase of a column FEC packet immediately preceding the column packet is Offset×(NA−1)+1. When the difference is Offset×(NA−1)+1, the column FEC packet received anew is specified as a leading column FEC packet of a matrix.

When the leading column FEC packet can be specified in this way, if a row FEC packet having SNBase coinciding with that of the leading column FEC packet is found, the row FEC packet can be specified as a leading row FEC packet.

However, in the Pro-MPEG or the like, a column FEC packet may be transmitted at later timing than a row FEC packet of the same matrix. Therefore, at a point when a leading row FEC packet is received, a leading column FEC packet corresponding thereto may not be received yet, i.e., the corresponding leading column FEC packet may not be specified.

In such a case, after a leading column FEC packet is specified, a leading column FEC packet several matrixes ahead is estimated and specified as a leading column FEC packet anew. SNBase of the received row FEC packet only has to be compared with SNBase of the leading column FEC packet specified anew.

A sequence number of a leading column FEC packet "j" matrixes ahead can be specified as a sequence number of a leading column FEC packet of an original matrix+Offset×j. SNBase of the leading column FEC packet is SNBase of the leading column FEC packet of the original matrix+Offset× NA×j. Therefore, a row FEC packet having this SNBase is specified as a leading row FEC packet.

In the case of the Pro-MPEG, for example, transmission timing of the column FEC packet with the sequence number 1 and the row FEC packet with the sequence number 9 in FIG. 6 is as shown in FIG. 16. The column FEC packet with the sequence number 1 is transmitted when any one of data packets in a hatched portion (with sequence numbers 25 to 43) in the figure is transmitted. The row FEC packet with the sequence number 9 is transmitted, for example, when a data packet in a vertical stripe portion (with a sequence number 54) is transmitted.

A reception side receives the FEC packets generally in this order. In such a case, the column FEC packet with the sequence number 1 is recognized as at the top when the data packets in the hatched portion are received. Therefore, "j" is set to 2 and, in two matrixes ahead, a column FEC packet with a sequence number 13 is specified as a leading column FEC packet.

SNBase of the column FEC packet with the sequence number 13 is 49, which coincides with SNBase of the row FEC packet with the sequence number 9 received after the column FEC packet. Therefore, a leading row FEC packet can be specified.

A row FEC packet, SNBase of which coincides with that of a leading column FEC packet, does not have to be searched. When a value obtained by dividing a difference between SNBase of an arbitrary row FEC packet and SNBase of the leading column FEC packet by Offset of the column FEC packet is represented as "p", a sequence number −p of the row FEC packet can be specified as a sequence number of a leading row FEC packet.

For example, in the case of FIG. 6, when the column FEC packet with the sequence number 1 is specified as at the top, a difference between SNBase of the column FEC packet and SNBase of the row FEC packet with the sequence number 9 is 48. When the difference 48 is divided by Offset 6, p=8 is obtained. It is seen that a row FEC packet with a sequence number 9−8=1 can be specified as a leading row FEC packet corresponding to the leading column FEC packet with the sequence number 1.

A leading column FEC packet and a leading row FEC packet may be specified by using arbitrary one column FEC packet and arbitrary one row FEC packet. SNBase of a received certain column FEC packet is represented as SNBase1 and SNBase of a certain row FEC packet is represented as SNBase 2. A quotient of (SNBase2−SNBase1−1) ÷Offset of the column FEC packet (or NA of the row FEC packet) is calculated as OffsetD and a remainder is calculated as OffsetL.

When a sequence number of the column FEC packet having SNBase1 is represented as SN1 and a sequence number of the row FEC packet having SNBase2 is represented as SN2, a sequence number of the leading column FEC packet of the matrix can be specified as SN1+(OffsetL+1)−Offset of the column FEC packet. A sequence number of the leading row FEC packet of the matrix can be specified as SN2−(OffsetD+ 1).

When this method is used, if there are arbitrary one column FEC packet and arbitrary one row FEC packet, it is possible to specify a leading column FEC packet and a leading row FEC packet.

For example, in FIG. 6, a leading FEC packet is specified by using a column FEC packet with the sequence number 9 and SNBase27 and a row FEC packet with the sequence number 11 and SNBase61. Since SN1=9, SN2=11, SNBase1=27, SNBase2=61, and Offset of the column FEC packet=6, OffsetD=5 and OffsetL=3.

When these values are substituted in the formula described above, a sequence number of a leading column FEC packet is 7 and a sequence number of a leading row FEC packet is 5. It is seen that a leading column FEC packet and a leading row FEC packet of a second matrix can be specified.

The data receiving apparatus according to the embodiment explained above receives data packets and FEC packets, stores the data packets and the FEC packets in the data storing unit, and, when necessary, performs restoration of lost data. The data receiving apparatus may further include a processing unit that performs processing at a post stage for reading out data stored in the data storing unit and displaying and reproducing video data and sound data of the data.

The method of specifying a leading FEC packet using the several methods has been explained. However, even if the leading FEC packet is specified by using these methods, it is likely that, due to convenience on a transmission side, specifications of a matrix (i.e., the number of packets per one column, the number of packets per one row, a relation between a sequence number and SNBase of an FEC packet, etc. of the matrix) dynamically change. In that case, it is possible to detect the change in the specifications of the matrix by using a data receiving apparatus shown in FIG. 17.

Figure 17:
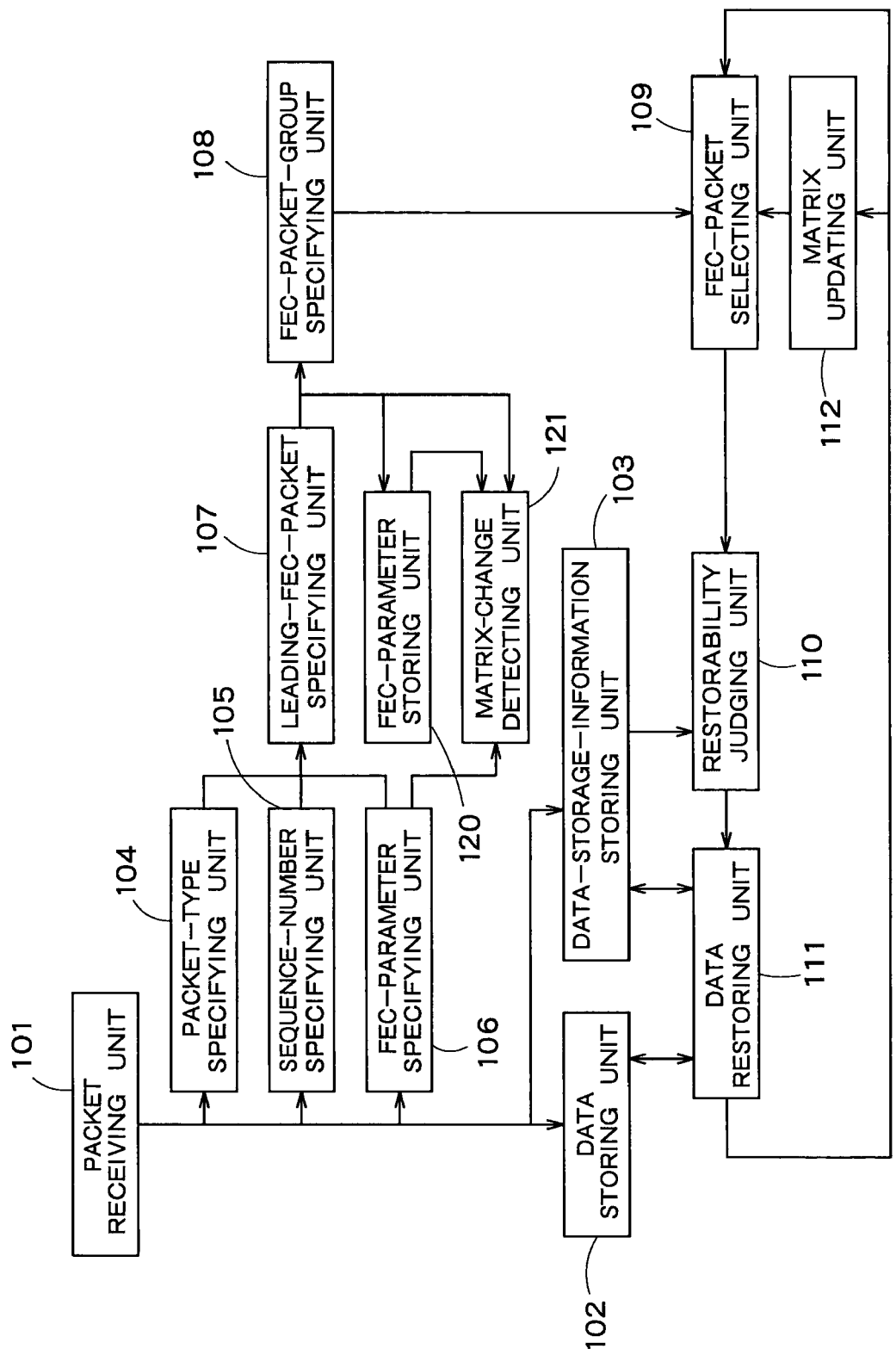
FIG. 17 is a schematic diagram of a data receiving apparatus according to a modification.

The data receiving apparatus shown in FIG. 17 further includes, in addition to the components of the data receiving apparatus shown in FIG. 1, an FEC-parameter storing unit 120 and a matrix-change detecting unit 121.

The FEC-parameter storing unit 120 stores sequence numbers and FEC parameters of a leading column FEC packet and a leading row FEC packet specified by the leading-FEC-packet specifying unit 107.

The matrix-change detecting unit 121 detects the change in the specifications of the matrix using FEC parameters of received FEC packets specified by the FEC-parameter specifying unit 106 and information stored in the FEC-parameter storing unit 120.

For example, the matrix-change detecting unit 121 compares Offset or NA of a column FEC packet or a row FEC packet specified by the FEC-parameter specifying unit 106 and Offset or NA of a leading column FEC packet or a leading row FEC packet specified by the leading-FEC-packet specifying unit 107 stored in the FEC-parameter storing unit 120. As a result of the comparison, when Offsets or NAs do not coincide with each other, this means that the number of packets per one column or the number of packets per one row of the matrix has changed. Therefore, the matrix-change detecting unit 121 detects the change in the specifications of the matrix.

Even if the number of packets per one column or the number of packets per one row of the matrix does not change, in some case, an increase in a sequence number of an FEC packet and an increase in a sequence number of a data packet indicated by the FEC packet, i.e., SNBase are inconsistent.

For example, in the case of the matrixes shown in FIG. 6, a sequence number of a column FEC packet increases by 6 every time a matrix shifts to the next matrix. SNBase increases by 6×4=24. In other words, when leading column FEC packets are compared, a relation, a difference between sequence numbers thereof×the vertical length (the number of packets in the column direction) of the matrix=a difference between SNBases, holds. Therefore, when this relation does not hold, this means that the specifications of the matrix change.

Similarly, in the case of a row FEC packet, a relation, a difference between sequence numbers×the horizontal length (the number of packets in the row direction) of the matrix=a difference between SNBases, holds. When this relation does not hold, this means that the specifications of the matrix change.

Therefore, in order to detect such a change in the specifications of the matrixes, even if the leading-FEC-packet specifying unit 107 once specifies a leading row FEC packet and a leading column FEC packet, the leading-FEC-packet specifying unit 107 continues to specify a leading row FEC packet and a leading column FEC packet of each matrix.

Every time the leading row FEC packet and the leading column FEC packet of each matrix are specified, sequence numbers and SNBases of the FEC packets are stored in the FEC-parameter storing unit 120.

The matrix-change detecting unit 121 judges, using sequence numbers and SNBases stored anew in the FEC-parameter storing unit 120 and sequence numbers and SNBases stored immediately preceding the sequence numbers and the SNBases, whether the relational expression described above holds for each of column FEC packets and row FEC packets. When the relational expression does not hold, it is detected that the specifications of the matrix change.

When the matrix-change detecting unit 121 detects, with the method explained above, that the specifications of the matrix change, a leading matrix is specified again.

The data receiving apparatus according to the embodiment explained above can be realized by causing a processor mounted on a general-purpose computer apparatus to execute a program. The data receiving apparatus may be realized by installing the program in the computer apparatus in advance or may be realized by storing the program in a storage medium such as a CD-ROM, distributing the program via a network, and installing the program in the computer apparatus as appropriate.

What is claimed is:

1. A data receiving apparatus comprising:
   a packet receiving unit that receives packets;
   a packet-type specifying unit that specifies which of types of a data packet, a column FEC packet, and a row FEC packet the packets are;
   a sequence-number specifying unit that specifies sequence numbers of the packets;
   a data storing unit that stores, in association with the specified types and the specified sequence numbers;
   a data-storage-information storing unit that stores, in association with sequence numbers of data packets received by the packet receiving unit, data storage information indicating that data portions of the data packets are stored in the data storing unit;
   an FEC-parameter specifying unit that analyzes headers of column FEC packets and row FEC packets and specifies FEC parameters including SNBase which is a value indicating a minimum sequence number among sequence numbers of plural data packets used for generation of an FEC packet, Offset which is a value indicating difference between sequence numbers of data packets adjacent to each other when the plural data packets used for generation of the FEC packet are arranged in order of the sequence numbers, and NA which is a value indicating a number of the data packets used for generation of the FEC packet;
   a leading-FEC-packet specifying unit that specifies, using at least SNBase specified from a first column FEC packet and SNBase specified from a second column FEC packet or a row FEC packet, a leading column FEC packet and a leading row FEC packet as FEC packets at a top of a matrix;
   an FEC-packet-group specifying unit that specifies a column FEC packet group including column FEC packets corresponding to a matrix same as the matrix of the leading column FEC packet and a row FEC packet group including row FEC packets corresponding to a matrix same as the matrix of the leading row FEC packet;
   an FEC-packet selecting unit that selects one FEC packet from the column FEC packet group or the row FEC packet group;
   a restorability judging unit that specifies, on the basis of the FEC parameter of the FEC packet selected by the FEC-packet selecting unit, sequence numbers of plural data packets corresponding to the selected FEC parameter, detects, on the basis of the data storage information stored in the data-storage-information storing unit, whether data portions of the data packets with the specified plural sequence numbers are stored in the data storing unit, judges, when a number of lost data packets, data portions of which are not stored, is one, that restoration of the lost data packet is possible and outputs a restoration start signal, and, judges, when the number of lost data packets is other than one, that restoration of the lost data packets is impossible; and
   a data-restoring unit that reads out, on the basis of the restoration start signal, data of a FEC packet and a data packet corresponding to the lost data packet from the data storing unit, restores the lost data packet using the read-out data, stores the restored data packet in the data storing unit, and stores, in the data-storage-information storing unit in association with a sequence number of the restored data packet, data storage information indicating that a data portion of the restored data packet is stored in the data storing unit.

2. The apparatus according to claim 1, wherein the FEC-packet selecting unit selects, at least once, all column FEC packets included in the column FEC packet group and all row FEC packets included in the row FEC packet group, selects, when the data restoring unit performs restoration of the lost data packet using the column FEC packet, a row FEC packet after the restoration, and, selects, when the data restoring unit performs restoration of the lost data packet using the row FEC packet, a column FEC packet after the restoration.

3. The apparatus according to claim 1, wherein the leading-FEC-packet specifying unit detects whether a difference between SNBase specified from the first column FEC packet and SNBase specified from the row FEC packet is equal to Offset×k, in which k is an integer, specified from the first column FEC packet or NA×k specified from the second column FEC packet and specifies, when the difference is equal to Offset×k or NA×k, the first column FEC packet as a leading column FEC packet.

4. The apparatus according to claim 1, wherein the leading-FEC-packet specifying unit detects whether SNBase specified from the first column FEC packet and SNBase specified from the row FEC packet coincide with each other and specifies, when the SNBases coincide with each other, the first column FEC packet as a leading column FEC packet.

5. The apparatus according to claim 1, wherein
a sequence number of the second column FEC packet is a value obtained by subtracting 1 from a sequence number of the first column FEC packet, and
the leading-FEC-packet specifying unit detects whether SNBase specified from the first column FEC packet is equal to a value obtained by adding 1 to SNBase specified from the second column FEC packet and specifies, when the SNBase is not equal to the value, the first column FEC packet as a leading column FEC packet.

6. The apparatus according to claim 1, wherein the leading-FEC-packet specifying unit detects whether a difference between SNBase specified from the first column FEC packet and SNBase specified from the second column FEC packet coincides with Offset specified from the first column FEC packet×(NA specified from the first column FEC packet−1)+1 and specifies, when the SNBase coincides with the Offset specified from the first column FEC packet×(NA specified from the first column FEC packet−1)+1, the first column FEC packet as a leading column FEC packet.

7. The apparatus according to claim 1, wherein the leading-FEC-packet specifying unit calculates, after a leading column FEC packet is specified, a quotient "p" which is an integer, by dividing a difference between SNBase specified from the row FEC packet and SNBase specified from the leading column FEC packet by Offset specified from the leading column FEC packet or NA specified from the row FEC packet and specifies a row FEC packet, a sequence number of which is a sequence number of the row FEC packet−"p", as a leading row FEC packet.

8. The apparatus according to claim 1, wherein the leading-FEC-packet specifying unit detects, after a leading column FEC packet is specified, whether SNBase specified from the row FEC packet and SNBase specified from the leading column FEC packet coincide with each other and specifies, when the SNBases coincide with each other, the row FEC packet as a leading row FEC packet.

9. The apparatus according to claim 1, wherein the leading-FEC-packet specifying unit performs, when a sequence number of the first column FEC packet is represented as SN1, SNBase thereof is represented as SNBase1, a sequence number of the row FEC packet is represented as SN2, and SNBase thereof is represented as SNBase2, an arithmetic operation (SNBase2−SNBase1−1)÷Offset of the first column FEC packet to calculate a quotient OffsetD and a remainder OffsetL, specifies a column FEC packet, a sequence number of which is SN1+OffsetL+1−Offset of the first column FEC packet, as a leading column FEC packet, and specifies a row FEC packet, a sequence number of which is SN2−OffsetD−1, as a leading row FEC packet.

10. The apparatus according to claim 1, further comprising:
an FEC-parameter storing unit that stores sequence numbers and FEC parameters of the leading column FEC packet and the row FEC packet specified by the leading-FEC-packet specifying unit; and
a matrix-change detecting unit that judges whether Offset or SNBase of a column FEC packet specified by the FEC-parameter specifying unit and Offset or SNBase of the leading column FEC packet stored in the FEC-parameter storing unit are equal, whether Offset or SNBase of a row FEC packet specified by the FEC-parameter specifying unit and Offset or SNBase of the leading row FEC packet stored in the FEC-parameter storing unit are equal, whether a product of a difference between sequence numbers of the different two leading column FEC packets stored in the FEC-parameter storing unit and NA is equal to a difference between SNBases, and whether a product of a difference between sequence numbers of the different two leading column FEC packets stored in the FEC-parameter storing unit and NA is equal to a difference between SNBases and detects, when it is judged that at least any one of the foregoing is not equal, that specifications of the matrix changes.

11. The apparatus according to claim 1, further comprising a matrix updating unit that specifies, when no restorable data packet is left in the matrix, column FEC packets equivalent to a number of Offsets of the column FEC packets following in order of sequence numbers of column FEC packets included in the column FEC packet group and row FEC packets equivalent to a number of NAs of the column FEC packets following in order of sequence numbers of row FEC packets included in the row FEC packet group as a column FEC packet group and a row FEC packet group corresponding to a next matrix and updates the matrix.

12. The apparatus according to claim 1, wherein
the FEC-packet selecting unit sequentially selects all FEC packets included in one of the column FEC packet group and the row FEC packet group and then sequentially selects all FEC packets included in the other of the column FEC packet group and the row FEC packet group and, in selecting the FEC packets included in the other of the column FEC packet group and the row FEC packet group, sequentially selects, when restoration of a lost data packet is performed, all FEC packets included in one of the column FEC packet group and the row FEC packet group again.

13. The apparatus according to claim 1, wherein, when, according to selection of an FEC packet included in one of the column FEC packet group and the row FEC packet group, restoration of an mth data packet, where m is a natural number, is performed in order of sequence numbers among data packets corresponding to the FEC packet, the FEC-packet selecting unit preferentially selects mth FEC packet in order of sequence numbers among FEC packets included in the other of the column FEC packet group and the row FEC packet group.

14. The apparatus according to claim 1, further comprising:
a number-of-losses specifying unit that specifies, referring to the data storage information stored in the data-storage-information storing unit, a number of losses of data packets corresponding to each of column FEC packets included in the column FEC packet group and row FEC packets included in the row FEC packet group;
a number-of-losses storing unit that stores the number of losses for each of the FEC packets; and
a number-of-losses reducing unit that reduces the number of losses, which is stored in the number-of-losses storing unit, of the FEC packets corresponding to the data packets restored by the data restoring unit by one, wherein
the restorability judging unit judges, when the number of losses, which is stored in the number-of-losses storing unit, of the FEC packets selected by the FEC-packet selecting unit is one, that restoration of the lost data packet is possible and outputs the restoration start signal and judges, when the number of losses is other than one, that restoration of lost data packets is impossible.

15. A data receiving method comprising:
receiving packets;
specifying which of types of a data packet, a column FEC packet, and a row FEC packet the packets are;

specifying sequence numbers of the packets;
storing, in association with the specified types and the specified sequence numbers, the packets in a data storing unit;
storing, in a data-storage-information storing unit in association with sequence number of received data packets, data storage information indicating that data portions of the data packets are stored in the data storing unit;
analyzing headers of column FEC packets and row FEC packets of the received packets and specifying FEC parameters including SNBase which is a value indicating a minimum sequence number among sequence numbers of plural data packets used for generation of an FEC packet, Offset which is a value indicating difference between sequence numbers of data packets adjacent to each other when the plural data packets used for generation of the FEC packet are arranged in order of the sequence numbers, and NA which is a value indicating a number of the data packets used for generation of the FEC packet;
specifying, using at least SNBase specified from a first column FEC packet and SNBase specified from a second column FEC packet or a row FEC packet, a leading column FEC packet and a leading row FEC packet as FEC packets at a top of a matrix;
specifying a column FEC packet group including column FEC packets corresponding to a matrix same as the matrix of the leading column FEC packet and a row FEC packet group including row FEC packets corresponding to a matrix same as the matrix of the leading row FEC packet;
selecting one FEC packet from the column FEC packet group or the row FEC packet group;
specifying, on the basis of the FEC parameter of the selected FEC packet, sequence numbers of plural data packets corresponding to the selected FEC parameter, detecting, on the basis of the data storage information stored in the data-storage-information storing unit, whether data portions of the data packets with the specified plural sequence numbers are stored in the data storing unit, judging, when a number of lost data packets, data portions of which are not stored, is one, that restoration of the lost data packet is possible and judging, when the number of lost data packets is other than one, that restoration of the lost data packets is impossible; and
reading out, when it is judged that the lost data packet is restorable, data of a FEC packet and a data packet corresponding to the lost data packet from the data storing unit, restoring the lost data packet using the read-out data, storing the restored data packet in the data storing unit, and storing, in the data-storage-information storing unit in association with a sequence number of the restored data packet, data storage information indicating that a data portion of the restored data packet is stored in the data storing unit.

16. The method according to claim 15, further comprising:
selecting, at least once, all column FEC packets included in the column FEC packet group and all row FEC packets included in the row FEC packet group;
selecting, when restoration of the lost data packet is performed by using the column FEC packet, a row FEC packet after the restoration; and
selecting, when restoration of the lost data packet is performed by using the row FEC packet, a column FEC packet after the restoration.

17. The method according to claim 15, further comprising detecting whether a difference between SNBase specified from the first column FEC packet and SNBase specified from the row FEC packet is equal to Offset×k, in which k is an integer, specified from the first column FEC packet or NA×k specified from the second column FEC packet and specifying, when the difference is equal to Offset×k or NA×k, the first column FEC packet as a leading column FEC packet.

18. The method according to claim 15, wherein
a sequence number of the second column FEC packet is a value obtained by subtracting 1 from a sequence number of the first column FEC packet, and
the data receiving method includes detecting whether SNBase specified from the first column FEC packet is equal to a value obtained by adding 1 to SNBase specified from the second column FEC packet and specifying, when the SNBase is not equal to the value, the first column FEC packet as a leading column FEC packet.

19. The method according to claim 15, further comprising detecting whether a difference between SNBase specified from the first column FEC packet and SNBase specified from the second column FEC packet coincides with Offset specified from the first column FEC packet×(NA specified from the first column FEC packet−1)+1 and specifying, when the SNBase coincides with the Offset specified from the first column FEC packet×(NA specified from the first column FEC packet−1)+1, the first column FEC packet as a leading column FEC packet.

20. The method according to claim 15, further comprising specifying, after no restorable data packet is left in the matrix, column FEC packets equivalent to a number of Offsets of the column FEC packets following in order of sequence numbers of column FEC packets included in the column FEC packet group and row FEC packets equivalent to a number of NAs of the column FEC packets following in order of sequence numbers of row FEC packets included in the row FEC packet group as a column FEC packet group and a row FEC packet group corresponding to a next matrix and updating the matrix.

21. A computer-readable recording medium having recorded therein a data receiving program which causes a computer to execute:
a step of receiving packets;
a step of specifying which of types of a data packet, a column FEC packet, and a row FEC packet the packets are;
a step of specifying sequence numbers of the packets;
a step of storing, in association with the specified types and the specified sequence numbers, the packets in a data storing unit;
a step of storing, in a data-storage-information storing unit in association with sequence number of received data packets, data storage information indicating that data portions of the data packets are stored in the data storing unit;
a step of analyzing headers of a column FEC packet and a row FEC packet of the received packets and specifying FEC parameters including SNBase which is a value indicating a minimum sequence number among sequence numbers of plural data packets used for generation of an FEC packet, Offset which is a value indicating difference between sequence numbers of data packets adjacent to each other when the plural data packets used for generation of the FEC packet are arranged in order of the sequence numbers, and NA which is a value indicating a number of the data packets used for generation of the FEC packet;
a step of specifying, using at least SNBase specified from a first column FEC packet and SNBase specified from a second column FEC packet or a row FEC packet, a leading column FEC packet and a leading row FEC packet as FEC packets at a top of a matrix;

a step of specifying a column FEC packet group including column FEC packets corresponding to a matrix same as the matrix of the leading column FEC packet and a row FEC packet group including row FEC packets corresponding to a matrix same as the matrix of the leading row FEC packet;

a step of selecting one FEC packet from the column FEC packet group or the row FEC packet group;

a step of specifying, on the basis of the FEC parameter of the selected FEC packet, sequence numbers of plural data packets corresponding to the selected FEC parameter, detecting, on the basis of the data storage information stored in the data-storage-information storing unit, whether data portions of the data packets with the specified plural sequence numbers are stored in the data storing unit, judging, when a number of lost data packets, data portions of which are not stored, is one, that restoration of the lost data packet is possible and judging, when the number of lost data packets is other than one, that restoration of the lost data packets is impossible; and a step of reading out, when it is judged that the lost data packet is restorable, data of a FEC packet and a data packet corresponding to the lost data packet from the data storing unit, restoring the lost data packet using the read-out data, storing the restored data packet in the data storing unit, and storing, in the data-storage-information storing unit in association with a sequence number of the restored data packet, data storage information indicating that a data portion of the restored data packet is stored in the data storing unit.

* * * * *